(12) United States Patent
Vallance et al.

(10) Patent No.: US 10,598,873 B2
(45) Date of Patent: *Mar. 24, 2020

(54) OPTICAL ALIGNMENT OF AN OPTICAL SUBASSEMBLY TO AN OPTOELECTRONIC DEVICE

(71) Applicant: NANOPRECISION PRODUCTS, INC., El Segundo, CA (US)

(72) Inventors: Robert Ryan Vallance, Newbury Park, CA (US); Gregory L. Klotz, La Verne, CA (US); Rand D. Dannenberg, Newbury Park, CA (US)

(73) Assignee: CUDOQUANTA FLORIDA, INC., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,842

(22) Filed: Jul. 16, 2018

(65) Prior Publication Data

US 2019/0137705 A1    May 9, 2019

Related U.S. Application Data

(63) Continuation of application No. 15/460,228, filed on Mar. 15, 2017, now Pat. No. 10,025,043.

(Continued)

(51) Int. Cl.
*G02B 6/42* (2006.01)
*G02B 6/124* (2006.01)
(Continued)

(52) U.S. Cl.
CPC .......... *G02B 6/4225* (2013.01); *G02B 6/124* (2013.01); *G02B 6/422* (2013.01); *G02B 6/4214* (2013.01);
(Continued)

(58) Field of Classification Search
CPC .. G02B 6/4225; G02B 6/4214; G02B 6/4249; G02B 6/124; G02B 6/422; G02B 6/305; G02B 2006/12104; G02B 6/34
See application file for complete search history.

(56) References Cited

U.S. PATENT DOCUMENTS 5,479,540 A * 12/1995 Boudreau ............ G02B 6/4231
385/14
5,911,022 A *  6/1999 Plickert ......................... 385/14
(Continued)

FOREIGN PATENT DOCUMENTS

WO    2015/176049    11/2015

OTHER PUBLICATIONS

International Search Report of Counterpart PCT International Application No. PCT/US2017/022609.

*Primary Examiner* — Andrew Jordan
(74) *Attorney, Agent, or Firm* — Liu & Liu

(57) ABSTRACT

Optical alignment of optical subassembly and optoelectronic device is achieved using an external source and an external receiver, passing optical signal through a passive waveguide in the optoelectronic device, via alignment reflective surface features provided on the optical subassembly. The optical subassembly is provided with a first alignment reflective surface directing alignment signal from the source to a grating coupler at the input of the waveguide, and a second alignment reflective surface directing to the receiver the alignment signal directed from a grating coupler at the output of the waveguide after the alignment signal has been transmitted from the input to the output through the waveguide. By adjusting the relative position between the optical subassembly and the optoelectronic device, and detecting the maximum optical power of the alignment signal reflected from the second alignment reflective surface, the position of (Continued)

best optical alignment of the optical subassembly and the optoelectronic device can be determined.

18 Claims, 9 Drawing Sheets

Related U.S. Application Data

(60) Provisional application No. 62/308,817, filed on Mar. 15, 2016, provisional application No. 62/308,818, filed on Mar. 15, 2016.

(51) Int. Cl.
*G02B 6/30* (2006.01)
*G02B 6/34* (2006.01)
*G02B 6/12* (2006.01)

(52) U.S. Cl.
CPC ............ *G02B 6/4249* (2013.01); *G02B 6/305* (2013.01); *G02B 6/34* (2013.01); *G02B 2006/12104* (2013.01)

(56) References Cited

U.S. PATENT DOCUMENTS

| | | | | |
|---|---|---|---|---|
| 6,654,523 B1* | 11/2003 | Cole | .................... | G02B 6/4225 385/14 |
| 7,184,626 B1* | 2/2007 | Gunn, III | ........... | G02B 6/12007 324/750.23 |
| 7,224,174 B1* | 5/2007 | Malendevich | ..... | G02B 6/12007 324/750.23 |
| 7,378,861 B1* | 5/2008 | Malendevich | ......... | G02B 6/124 324/750.23 |
| 7,800,734 B2* | 9/2010 | Komatsuda | ........ | G02B 27/0927 355/52 |
| 8,064,745 B2* | 11/2011 | Fortusini | .................. | G02B 6/34 385/129 |
| 8,961,034 B2* | 2/2015 | Li | ........................ | G02B 6/3858 385/65 |
| 9,091,833 B2* | 7/2015 | Chen | .................... | G02B 6/4471 |
| 9,213,148 B2* | 12/2015 | Li | ........................ | G02B 6/3636 |
| 9,279,942 B2* | 3/2016 | Li | ........................ | G02B 6/3839 |
| 9,297,849 B2* | 3/2016 | Shin | .................... | G01R 31/2601 |
| 9,391,709 B2* | 7/2016 | Tamura | ................ | H04B 10/506 |
| 9,400,360 B2* | 7/2016 | McColloch | .......... | G02B 6/4246 |
| 9,459,177 B1* | 10/2016 | Dong | .................... | G01M 11/30 |
| 9,507,099 B2* | 11/2016 | Li | ........................ | G02B 6/3839 |
| 9,690,054 B2* | 6/2017 | Li | ........................ | G02B 6/3839 |
| 9,782,814 B2* | 10/2017 | Li | ........................ | G02B 6/4214 |
| 9,798,087 B1* | 10/2017 | Mathai | ............... | G02B 6/29367 |
| 9,880,366 B2* | 1/2018 | Vallance | ............... | G02B 6/4251 |
| 10,025,043 B2* | 7/2018 | Vallance | ............... | G02B 6/422 |
| 10,371,905 B2* | 8/2019 | Hirano | ................ | G02B 6/4214 |
| 10,386,575 B2* | 8/2019 | Cote | .................... | B29D 11/00 |
| 10,409,014 B1* | 9/2019 | Ramachandran | ..... | G02B 6/4243 |
| 10,454,586 B2* | 10/2019 | DeDobbelaere | ...... | G02B 6/4295 |
| 2010/0329603 A1* | 12/2010 | Kopp | ....................... | G02B 6/30 385/14 |
| 2012/0257860 A1* | 10/2012 | Li | ......................... | G02B 6/3858 385/83 |
| 2013/0121656 A1* | 5/2013 | Chen | .................... | G02B 6/4471 385/135 |
| 2013/0148966 A1* | 6/2013 | Kurokawa | .............. | H04J 14/02 398/65 |
| 2013/0266268 A1* | 10/2013 | Li | ......................... | G02B 6/3839 385/81 |
| 2013/0266271 A1* | 10/2013 | Li | ......................... | G02B 6/3839 385/83 |
| 2013/0294732 A1* | 11/2013 | Li | ......................... | G02B 6/4219 385/83 |
| 2013/0322818 A1* | 12/2013 | Li | ......................... | G02B 6/262 385/31 |
| 2014/0083273 A1* | 3/2014 | Vallance | .................. | B26D 3/08 83/880 |
| 2014/0205246 A1* | 7/2014 | Li | ......................... | G02B 6/3636 385/83 |
| 2015/0036980 A1* | 2/2015 | Li | ......................... | G02B 6/3839 385/81 |
| 2015/0125110 A1* | 5/2015 | Anderson | .............. | G02B 6/122 385/14 |
| 2015/0338585 A1* | 11/2015 | Li | ......................... | G02B 6/423 385/31 |
| 2015/0355420 A1* | 12/2015 | Li | ......................... | G02B 6/3648 385/35 |
| 2016/0016218 A1* | 1/2016 | Li | ......................... | G02B 6/4214 385/137 |
| 2016/0161686 A1* | 6/2016 | Li | ......................... | G02B 6/4214 385/92 |
| 2016/0178853 A1* | 6/2016 | Li | ......................... | G02B 6/3839 385/78 |
| 2016/0187583 A1* | 6/2016 | Vallance | .................. | G02B 6/25 225/2 |
| 2016/0187592 A1* | 6/2016 | Woodward | ........... | G02B 6/3863 385/85 |
| 2016/0187599 A1* | 6/2016 | Li | ......................... | G02B 6/3636 385/89 |
| 2016/0238803 A1* | 8/2016 | Li | ......................... | G02B 6/262 |
| 2016/0238804 A1* | 8/2016 | Li | ......................... | G02B 6/4219 |
| 2016/0274310 A1* | 9/2016 | Li | ......................... | G02B 6/3821 |
| 2016/0274318 A1* | 9/2016 | Vallance | ................ | G02B 6/428 |
| 2016/0377821 A1* | 12/2016 | Vallance | ............... | G02B 6/4248 385/28 |
| 2017/0131474 A1* | 5/2017 | Dannenberg | ............ | H04J 14/02 |
| 2017/0131492 A1* | 5/2017 | Vallance | ............... | G02B 6/4251 |
| 2017/0131532 A1* | 5/2017 | Dannenberg | ............ | F24S 23/79 |
| 2017/0168246 A1* | 6/2017 | Li | ......................... | G02B 6/3839 |
| 2017/0299824 A1* | 10/2017 | Vallance | ................ | G02B 6/422 |
| 2018/0081123 A1* | 3/2018 | Li | ......................... | G02B 6/3818 |
| 2019/0137705 A1* | 5/2019 | Vallance | ................ | G02B 6/124 |

\* cited by examiner

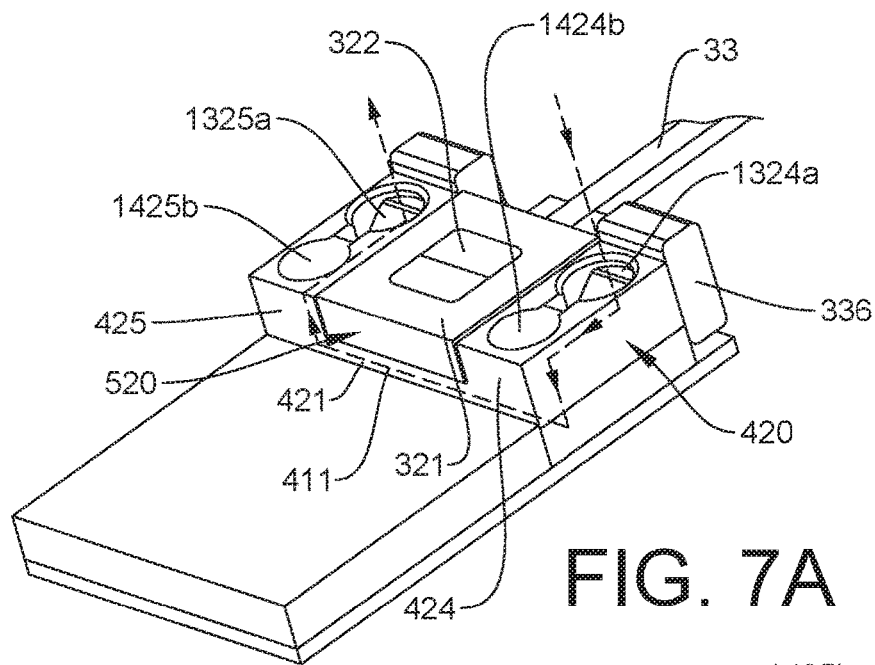
FIG. 7A
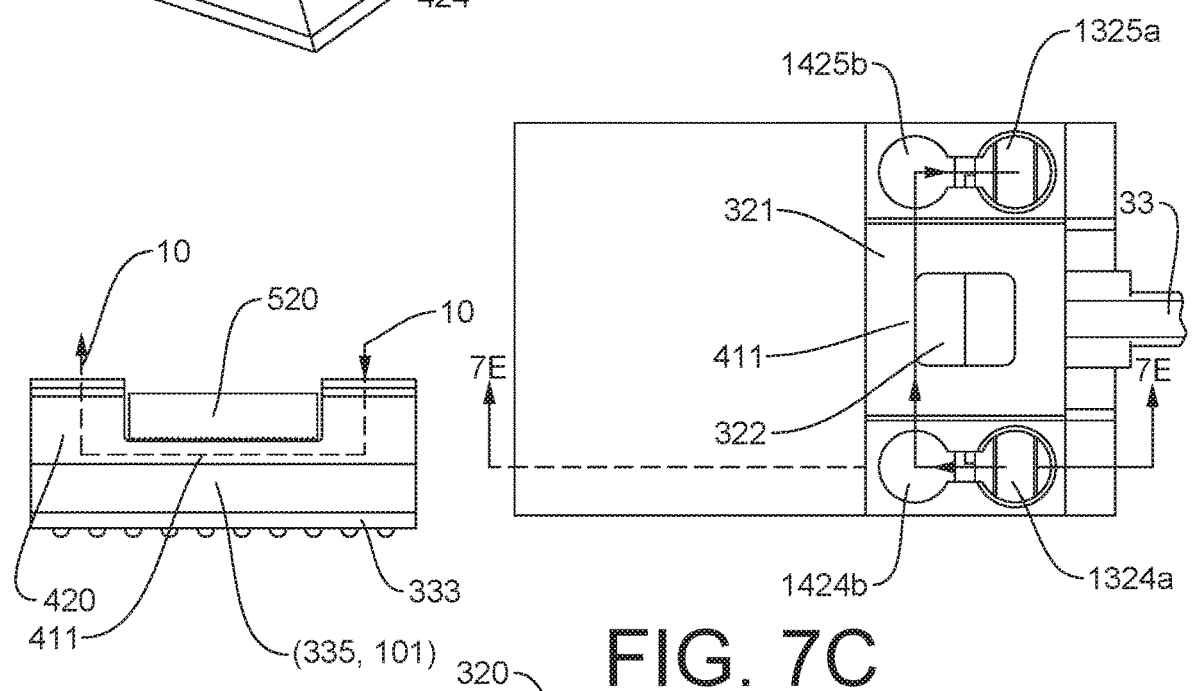
FIG. 7B
FIG. 7C
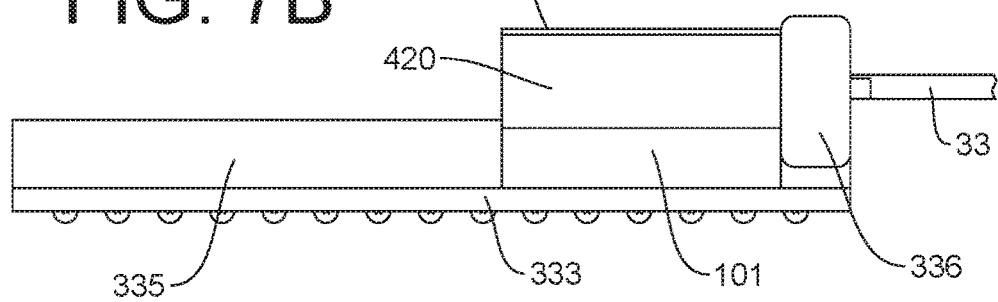
FIG. 7D

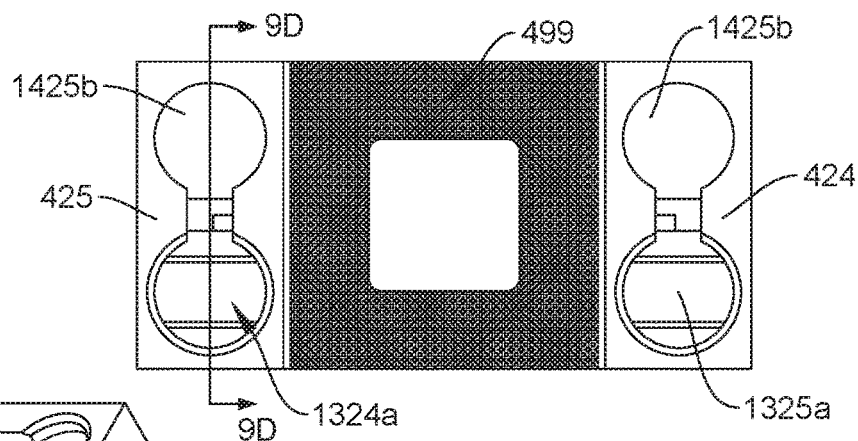
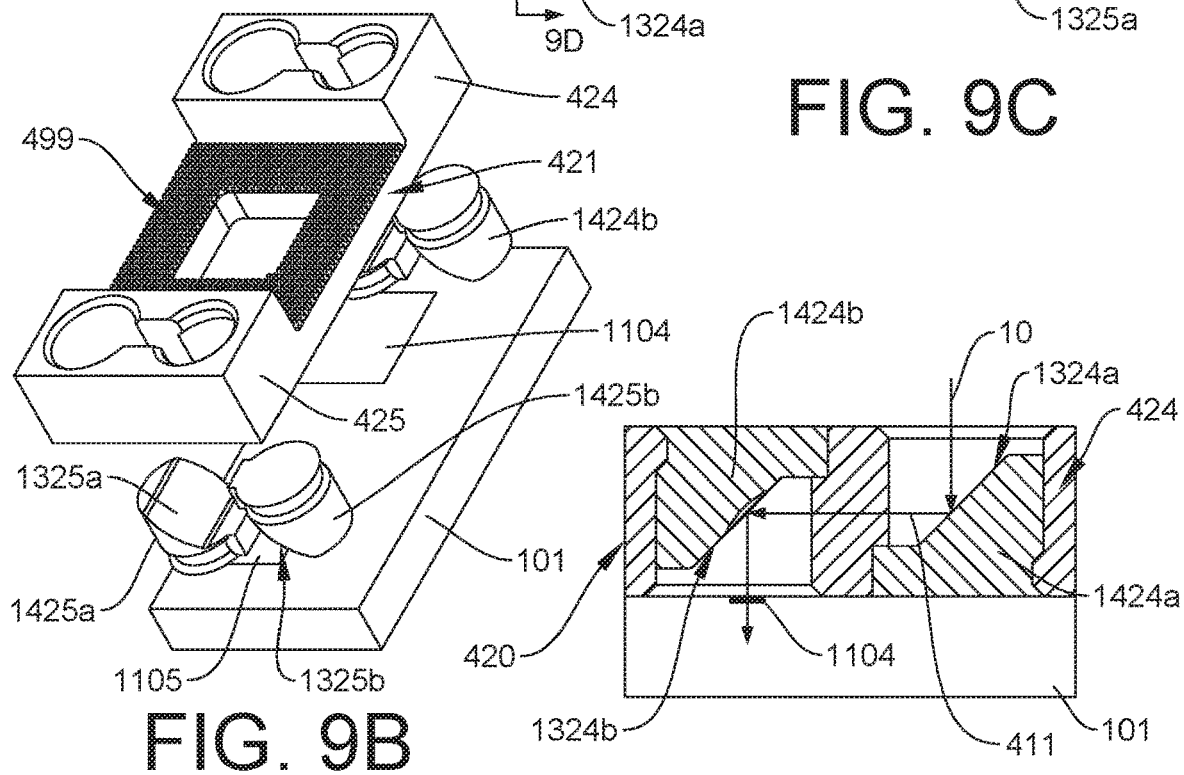
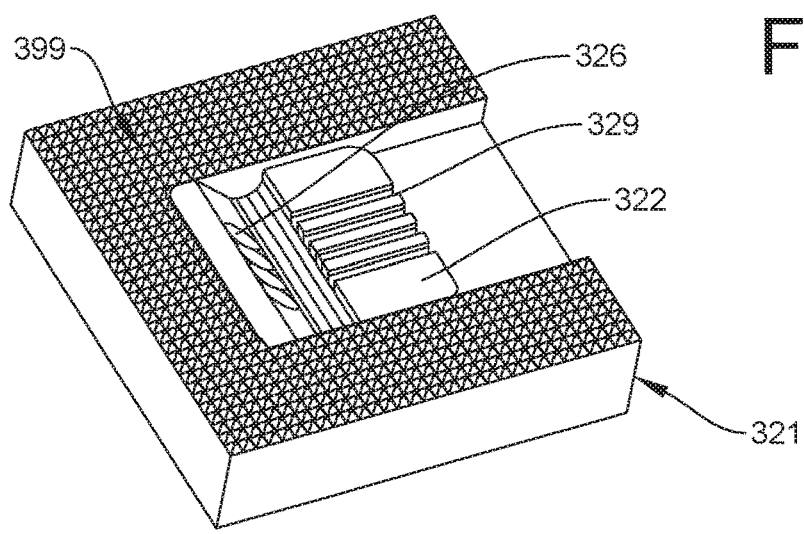
FIG. 9C
FIG. 9B
FIG. 9D
FIG. 10

OPTICAL ALIGNMENT OF AN OPTICAL SUBASSEMBLY TO AN OPTOELECTRONIC DEVICE

PRIORITY CLAIM

This application is a continuation of U.S. patent application Ser. No. 15/460,228 filed on Mar. 15, 2017, which claims the priority of: (a) U.S. Provisional Patent Application No. 62/308,817 filed on Mar. 15, 2016; and (b) U.S. Provisional Patent Application No. 62/308,818 filed on Mar. 15, 2016. These applications are fully incorporated by reference as if fully set forth herein. All publications noted below are fully incorporated by reference as if fully set forth herein.

BACKGROUND OF THE INVENTION

Field of the Invention

The present invention relates to coupling of light into and out of optoelectronic devices (e.g., photonic integrated circuits (PICs), laser arrays, photodiode arrays, etc.), and in particular to optical connections of optical subassemblies (e.g., optical benches, optical fiber subassemblies, etc.) to optoelectronic devices.

Description of Related Art

Optoelectronic devices may include optical and electronic components that source, detect and/or control light, converting between light signals and electrical signals. For example, a transceiver (Xcvr) is an optoelectronic module comprising both a transmitter (Tx) and a receiver (Rx) which are combined with circuitry within a housing. The transmitter includes a light source (e.g., a VCSEL or DFB laser), and the receiver includes a light sensor (e.g., a photodiode). Heretofore, a transceiver's circuitry is soldered onto a printed circuit board. Such a transceiver generally has a substrate that forms the bottom of a package (either hermetic or non-hermetic), and then optoelectronic devices such as lasers and photodiodes are soldered onto the substrate. Optical fibers are connected to the exterior of the package or fed through the wall of the package using a feedthrough (see, e.g., US20130294732A1, which had been commonly assigned to the Assignee/Applicant of the present application, and is fully incorporated as if fully set forth herein).

Optoelectronic devices may be implemented in the form of silicon photonics. Military and commercial applications of silicon photonics are emerging rapidly: optical interconnects for digital networking and super-computing, RADAR (RF over fiber), optical imaging and sensing such as laser ranging, biological sensing, environmental and gas sensing, and many others. These applications will require electronic-photonic co-packaging, and they will often require optical connections to fiber-optic cable or the inclusion of other passive optical devices such as lenses, filters, isolators, etc.

Despite wafer-scale production efficiency of the silicon photonic integrated circuit (SiPIC) and complimentary metal-oxide semiconductor (CMOS) circuits, assembling and packaging any optical elements, particularly fiber-optic connectors, remains a labor intensive and unreliable process that is not performed at wafer-scale and is performed at the back end-of-line where process failures generate valuable scraps. This is because optical assemblies require stringent tolerances on the position and alignment, and these alignment tolerances must be preserved through the manufacturing process and any subsequent environmental conditions, which can be very severe in defense related applications.

Economies of scale are driving the electronic-photonic packaging industry into the supply chain model illustrated in FIG. 1, which includes separate foundry, packaging, and product assembly entities. Each entity specializes and provides high-volume production facilities. Foundries fabricate the electronic IC using leading-edge CMOS technology. A separate foundry often fabricates the photonic IC using trailing-edge lithography processes since the optical devices are much larger than transistors. Foundries may produce stacks of ICs by assembling them using wafer-to-wafer or chip-to-wafer techniques. The IC assembly is then usually shipped to a separate facility that packages the ICs onto a silicon or glass interposer and/or an electrical substrate. Organic substrates with ball grid arrays are common in commercial applications, but defense related applications still often use ceramic substrates in hermetic packages. The electronic assembly is then shipped to another facility that integrates the electronic-photonic module onto another printed circuit board during product assembly. This facility usually attaches the fiber-optic cable and is responsible for testing the electro-optical performance. If any deficiencies are found, they are obligated to repair/rework/replace expensive photonic devices or fiber-optic cables.

This supply chain is problematic for high-volume, low-cost, photonic products that require fiber-optic connectors and cabling. The foundries are well equipped with cleanroom facilities and high-precision automated machinery, but this is too early in the process to attach fiber-optic cabling because the cables would interfere with the assembly of printed circuit boards at the packaging step. Unfortunately, high-precision expertise and equipment become less available at the packaging facility and even rarer at the product assembly facility. In many cases, the packager and product assembler have little if any experience with optical alignment and optical testing. This has been an extreme challenge for network switch manufacturers that have built network switches using mid-board electro-optical transceivers because it required cleanroom assembly methods and a great deal of electro-optical diagnostics and including testing of fiber-optic cables and connectors. Consequently, the switch manufacturers suffer with low yield rates due to optical connection problems that greatly increase production costs.

The Assignee of the present invention, nanoPrecision Products, Inc. (nPP), developed various proprietary optical coupling/connection devices having optical benches used in connection with optical data transmission. nPP has demonstrated the ability to manufacture metallic optical benches (MOBs) using ultra-high precision stamping process. This manufacturing technology produces low-volumes (hundreds per month) to high-volumes (millions per week) of MOBs with microscale features that have dimensional tolerances down to +/−250 nm. This makes it possible to stamp fiber-optic connector components that require sub-micrometer tolerances for high coupling efficiency in single-mode fiber-optic cabling or connecting optical fibers to photonic chips. For example, US2013/0322818A1 discloses an optical coupling device including an MOB having a stamped structured surface for routing optical data signals, in particular an optical coupling device for routing optical signals, including a base, a structured surface defined on the base, wherein the structured surface has one or more surface profiles (e.g., aspherical micro-mirrors) that reshape, fold and/or reflect incident light; and an alignment structure defined on the base, configured with a surface feature to facilitate positioning one or more optical components on the base in optical alignment with the structured surface to allow light to be transmitted along one or more defined paths between the structured surface and the one or more optical components, wherein the structured surface and the alignment structure are integrally defined on the base by stamping a malleable material of the base.

For proper operation, an optoelectronic device supported on a printed circuit board needs to efficiently couple light to an external optical fiber. Most optoelectronic devices (e.g., PICs) require single-mode optical connections that require stringent alignment tolerances between optical fibers and the devices, typically less than 1 micrometer. This is typically done by moving the fiber-optic connector while monitoring optical power transmitted between the PIC and the fibers in the connector. This active optical alignment procedure involves relatively complex, low throughput undertakings. The current state of the art active optical alignment procedures are expensive undertakings as they exclude use of common electronics and assembly processes, and/or often not suited to single-mode applications required by many PICs. The problems are exacerbated as it becomes even more challenging when many optical fibers are required to be optically aligned to elements on the PICs using active optical alignment procedure, in which the positions and orientations of the separate optical fibers are adjusted by machinery until the amount of optical power transferred between the optical fibers and PIC is maximized.

Further in this regard, the PIC must be energized during the active alignment process. If a laser is attached to the PIC, the laser must be energized for active optical alignment. This requires that the laser to be assembled to the PIC first and that electrical power be provided to the laser before the optical fiber connector can be aligned. If instead optical signals are sent through the optical fibers in the connector, the PIC still needs to be powered or otherwise energized and/or activated to provide a reading of the optical power from the optical signals to determine the maximum when optical alignment is achieved. Thus heretofore, electrical connections to the PIC is required for active optical alignment processes.

What is needed is an improved approach to optically align an optical subassembly (e.g., an MOB) to an optoelectronic device (e.g., a PIC), without having to provide electrical connections to the optoelectronic device, which would improve throughput, tolerance, manufacturability, ease of use, functionality and reliability at reduced costs.

SUMMARY OF THE INVENTION

The present invention overcomes the drawbacks of the prior art, by providing alignment features for optical aligning an optical subassembly (e.g., an optical subassembly including an MOB) to an optoelectronic device (e.g., a PIC) without requiring an electrical connection to the optoelectronic device. The inventive optical alignment scheme improves throughput, tolerance, manufacturability, ease of use, functionality and reliability at reduced costs.

In the context of the present invention, optical alignment involves positioning of the optical subassembly relative to the optoelectronic device, to align the optical axis of the respective optical elements or components of the optical subassembly to the optical axis of the corresponding optical elements or components of the optoelectronic device, so as to minimize optical signal attenuation between the optoelectronic device and optical subassembly to within acceptable tolerance.

In accordance with the present invention, the optoelectronic device is not provided with an active component (e.g., a laser, a photodiode, etc.) for optical alignment. Optical alignment of the optical subassembly and the optoelectronic device is achieved using an optical source and an optical receiver external to the optoelectronic device. The inventive optical alignment features and method achieves sub-micrometer optical alignment between the optical subassembly and the optoelectronic device, by using the optical receiver to measure feedback of optical power of an optical alignment signal provided by the optical source, which has been transmitted between optical alignment features provided on the optical subassembly and the optoelectronic device.

In one embodiment, an alignment feature in the form of a passive waveguide is provided in the optoelectronic device, and the position of the waveguide in relation to the alignment features on the optical subassembly is relied upon to determine optical alignment between the optical subassembly and the optoelectronic device.

In one embodiment, the passive waveguide is disposed outside the active region of the optoelectronic device. In the context of the present invention, the active region of the optoelectronic device is the region where the optical paths are defined for transmissions of optical data signals between the optical subassembly and the optoelectronic device during normal active operations of the optoelectronic device.

In one embodiment, the optical subassembly is provided with alignment features including a first alignment reflective surface directing (i.e., folding, reshaping and/or focusing) an optical alignment signal from the optical source to the input of the waveguide on the optoelectronic device, and a second alignment reflective surface directing (i.e., folding, reshaping and/or collimating) to the optical receiver the alignment signal directed from the output of the waveguide after the alignment signal has been transmitted from the input to the output through the waveguide. By adjusting the relative position between the optical subassembly and the optoelectronic device, and detecting the optical power of the alignment signal reflected from the second alignment reflective surface, the position of optimum optical alignment of the optical subassembly and the optoelectronic device can be determined (e.g., at a detected maximum optical power; i.e., at lowest optical signal attenuation).

In one embodiment, the input and output of the waveguide each comprises a grating coupler, with a first grating coupler receiving the alignment signal from the first alignment reflective surface of the optical subassembly, and a second grating coupler outputting the alignment signal to the second alignment reflective surface of the optical subassembly.

In one embodiment, the optical source and optical receiver are provided external of the optical subassembly.

In one embodiment, the optical subassembly comprises an optical bench subassembly, having optical data reflective surfaces defined thereon for directing operational data signals between the optical bench subassembly and the optoelectronic device during normal active operations of the optoelectronic device. In one embodiment, the optical bench subassembly is in the form of an optical fiber subassembly (OFSA) supporting one or more optical fibers in optical alignment with the data reflective surfaces (i.e., with the optical axis of the respective optical fibers aligned with the optical axis of the corresponding data reflective surface).

In one embodiment, the first and second alignment reflective surfaces are each formed by stamping a malleable metal.

In one embodiment, the optical subassembly further comprises a separate alignment structure having optical alignment features. The alignment structure comprises an alignment foundation supporting the optical bench subassembly in physically alignment to the foundation. The foundation is optically aligned to the optoelectronic device in accordance with the inventive alignment scheme, thereby optically aligning the optical bench subassembly supported on the foundation to the optoelectronic device. In one embodiment, the foundation is provided with alignments features including similar alignment reflective surfaces as the previous embodiment. In another embodiment, the foundation is provided with alignment features including a first pair of alignment reflective surfaces directing an optical alignment signal from the optical source to the input of the waveguide on the optoelectronic device, and a second pair of alignment reflective surfaces reflecting to the optical receiver the alignment signal directed from the output of the waveguide after the alignment signal has been transmitted from the input to the output through the waveguide. By adjusting the relative position between the foundation and the optoelectronic device, and detecting the optical power of the alignment signal reflected from the second pair of alignment reflective surfaces, the optimum optical alignment of the foundation and the optoelectronic device can be determined (e.g., at a detected maximum optical power).

In one embodiment, the optical bench subassembly and the foundation may be coupled by a reconnectable or demountable connection that is configured and structured to allow the optical bench assembly to be removably attachable for reconnection to the foundation in alignment therewith, after the foundation has be optically aligned to optoelectronic device. The foundation may be permanently attached with respect to the optoelectronic device. Alignment between the foundation and the optical bench subassembly may be achieved by passive, kinematic coupling, quasi-kinematic coupling, or elastic-averaging coupling. The passive alignment coupling allows the optical bench subassembly to be detachably coupled to the optoelectronic device, via a foundation that has been optically aligned to the optoelectronic device. The connector can be detached from the foundation and reattached to the foundation without compromising optical alignment. Accordingly, the foundation can be attached to a circuit board by optical alignment in accordance with the present invention, and after the circuit board is completely populated, an optical bench subassembly with optical fiber cables can be connected to the circuit board. Consequently, the optical fiber cables are not in the way during the assembly of the circuit board.

The present invention provides a method for optical alignment of an optical subassembly to an optoelectronic device which can be implemented with pick-and-place machinery with about a 1 micrometer positioning accuracy. This is adequate for single-mode optical connections.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 7A is a perspective view of the optical subassembly attached to an optoelectronic device with the securing clip removed; FIG. 7B is an end view thereof; FIG. 7C is a top view thereof; FIG. 7D is a side view thereof.

FIG. 9B is an exploded view thereof; FIG. 9C is a top view thereof; and FIG. 9D is a section view taken along line 9D-9D in FIG. 9C.

FIG. 10 is a perspective view of the optical bench subassembly of the optical subassembly of FIG. 6A.

DETAILED DESCRIPTION OF THE PREFERRED EMBODIMENTS

Figure 1:
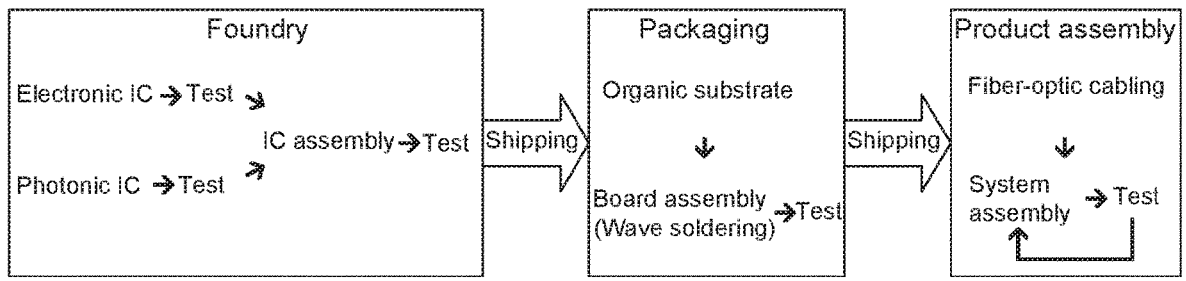
FIG. 1 is a schematic flow diagram depicting the supply chain model in electronic-photonic packaging industry.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention overcomes the drawbacks of the prior art, by providing alignment features and method for optical aligning an optical subassembly (e.g., an optical subassembly including an MOB) to an optoelectronic device (e.g., a PIC) without requiring an electrical connection to the optoelectronic device. The inventive optical alignment structure and method improves throughput, tolerance, manufacturability, ease of use, functionality and reliability at reduced costs.

In the context of the present invention, optical alignment involves positioning of the optical subassembly relative to the optoelectronic device, to align the optical axis of the respective optical elements and/or components of the optical subassembly to the optical axis of the corresponding optical elements and/or components of the optoelectronic device, so as to minimize optical signal attenuation between the optoelectronic device and optical subassembly to within acceptable tolerance.

In accordance with the present invention, the optoelectronic device is not provided with an active component (e.g., a laser, a photodiode, etc.) for optical alignment. Optical alignment of the optical subassembly and the optoelectronic device is achieved using an optical source and optical receiver external to the optoelectronic device. The inventive optical alignment scheme achieves sub-micrometer optical alignment between the optical subassembly and the optoelectronic device, by using the optical receiver to measure feedback of optical power of an optical alignment signal provided by the optical source, which has been transmitted between optical alignment features provided on the optical subassembly and the optoelectronic device.

By way of example and not limitation, the present invention will be described below in connection with an optoelectronic device in the form of a photonic integrated circuit (PIC), e.g., a silicon PIC (SiPIC), and an optical subassembly (OSA) in the form an optical fiber subassembly (OFSA). However, other types of optoelectronic devices (e.g., discrete devices such as lasers, photodiodes, transmitters, receivers and/or transceivers, which may not be implemented in a PIC) and optical subassemblies (e.g., with other optical elements or components, such as lenses, filters, lasers, photodiodes, etc., with or without optical fibers) may implement the optical alignment structure and method disclosed herein without departing from the scope and spirit of the present invention.

In one embodiment, the optical subassembly comprises an optical bench subassembly, having optical data reflective surfaces defined thereon for directing operational data signals between the optical bench subassembly and the optoelectronic device during normal active operations of the optoelectronic device. In the illustrated embodiment, the OSA is in the form of an OFSA supporting one or more optical fibers in optical alignment with the data reflective surfaces (i.e., with the optical axis of the respective optical fibers aligned with the optical axis of the corresponding data reflective surface).

Referring to the embodiment illustrated by FIGS. 2A to 3C, the OSA 20 comprises an optical bench subassembly, which more specifically is in the form of an OFSA. The OSA 20 comprises a base 21 and a core 22 supported in a space 29 within the base 21. The core 22 defines a plurality of grooves 23 for securely holding the end sections 31 of optical fibers 30 (i.e., bare sections having cladding exposed, without protective buffer and jacket layers 32) in the optical fiber cable 33. The core 22 also defines a plurality of data reflective surfaces 26 (e.g., concave aspherical micro-mirror surfaces) arranged in a row, which are each aligned to a corresponding groove 23, so that the end sections 31 of the optical fibers 30 held in grooves 23 are in optical alignment with the data reflective surfaces 26. Similar structures to base 21 and a core 22 and forming process thereof are disclosed in detail in US20160016218A1 (commonly assigned to the assignee of the present invention, and fully incorporated by reference herein), which discloses stamping to form a composite structure of dissimilar materials having structured features, including microscale features that are stamped into a more malleable material (e.g., aluminum) for the core, to form open grooves to retain optical fibers in optical alignment with a stamped array of aspherical micromirrors. As a result of stamping the features of the core while the material for the core is in place in the base, the core is attached to the base like a rivet. The present invention takes advantage of the concepts disclosed therein.

The grooves 23 are structured to securely retain the fibers sections 31 (bare section with cladding exposed, without protective buffer and jacket layers) by clamping the fiber section 31, e.g., by a mechanical or interference fit (or press fit). The interference fit assures that the fiber sections 31 are clamped in place and consequently the position and orientation of the fiber section 31 with respect to the data reflective surfaces 26 are set by the location and longitudinal axis of the grooves 23. Further details of the clamping open groove structure can be found in U.S. Pat. No. 8,961,034 B2 (commonly assigned to the assignee of the present invention, and fully incorporated by reference herein). The present invention takes advantage of the concepts disclosed therein.

As shown in the illustrated embodiment, a cable strain relief 27 is provided on the OSA 20 to provide protection to the optical fiber cable 33. In addition, a cover 28 is provided over the grooves 23, to reduce the risks of the fiber section 31 coming loose from the grooves 23. The cover 28 also functions as a spacer, as more clearly shown in FIGS. 4A and 4B.

The OSA 20 is provided with alignment features including a first alignment reflective surface 24 and a second alignment reflective surface 25 on the core 22. In the illustrated embodiment, the first and second alignment reflective surfaces 24 and 25 are located beyond the two ends of the row of data reflective surfaces 26, in a notch (34', 35,) at each side of the core 22. Generally, the first alignment reflective surface 24 directs (i.e., by folding, reshaping and/or focusing) an optical alignment signal 10 from an external optical source (e.g., a laser, not shown) to the PIC 100 (which will be further discussed later below in reference to grating couplers in FIGS. 4A, 4B and 5), and the second alignment reflective surface 25 directs (i.e., by folding, reshaping and/or collimating) to an external optical receiver (e.g., a photodiode, not shown) the same alignment signal 10 from the PIC 100 (which will be discussed further below in reference to grating couplers in FIGS. 4A, 4B and 5). The first and second alignment reflective surfaces 24 and 25 are not aligned to any optical fiber groove. These reflective surfaces 24 and 25 are used only for optical alignment purpose in accordance with the present invention, and they are not used for directing data optical signals during normal active operations of the PIC 100. As discussed further below, by adjusting the relative position between the OSA 20 and the PIC 100, and detecting the optical power of the alignment signal 20 reflected from the second alignment reflective surface 25, the position of optimum optical alignment of the OSA and the optoelectronic device can be determined (e.g., at a detected maximum optical power; i.e., at lowest optical signal attenuation).

In the illustrated embodiment, the optical source and optical receiver for alignment are provided external of the OSA 20. Clearances should be provided in the base 21 to allow the alignment optical signal 10 from the external source to be incident through the base 21 at the reflective surface 24 on the core 22, and to allow alignment optical signal 10 to be redirected from the alignment reflective surface 25 through the base 21 to the external receiver. In the illustrated embodiment, an opening, notch or cutout 34 is provided on the side of the base 21 matching the notch 34' on the side of the core 22, for the incident alignment optical signal 10, and an opening, notch or cutout 35 is provided on the side of the base 21 matching the notch 35' on the side of the core 22, for the redirected alignment optical signal 10 from the alignment reflective surface 25.

In one embodiment, the first and second alignment reflective surfaces 24 and 25, and the data reflective surfaces 26 are formed together by stamping a malleable metal of the core 22, so as to accurately define the relative positions of the alignment reflective surfaces 24 and 25 with respect to the data reflective surfaces 26 in a single stamping operation to achieve tight tolerances.

U.S. Pat. No. 7,343,770 (commonly assigned to the assignee of the present invention, and fully incorporated by reference herein) discloses a novel precision stamping system for manufacturing small tolerance parts. Such inventive stamping system can be implemented in various stamping processes to produce the structure disclosed herein. The disclosed stamping processes involve stamping a bulk material (e.g., a metal blank), to form the final surface features at tight (i.e., small) tolerances, including the reflective surfaces having a desired geometry in precise alignment with the other defined surface features. The present invention takes advantage of the concepts disclosed therein.

In accordance with the present invention, the reflective surfaces and grooves are dimensionally accurate to better than +/−500 nm, which is sufficient to achieve desirable optical alignment tolerance and low insertion loss of less than 0.5 dB (>89% coupling efficiency) for single-mode fiber-optic connections, and even achieving an insertion loss of as low as 0.35 dB (93% coupling efficiency).

In one embodiment, an alignment feature in the form of a passive waveguide is provided in the optoelectronic device, and the position of the waveguide in relation to the alignment features on the optical subassembly is relied upon to determine optical alignment between the optical subassembly and the optoelectronic device. In the illustrated embodiment, the input and output of the waveguide each comprises a grating coupler, with a first grating coupler 104 receiving the alignment signal 10 from the first alignment reflective surface 24 of the OSA 20, and a second grating coupler 105 outputting the alignment signal 10 to the second alignment reflective surface 25 of the OSA 20.

Figure 5A:
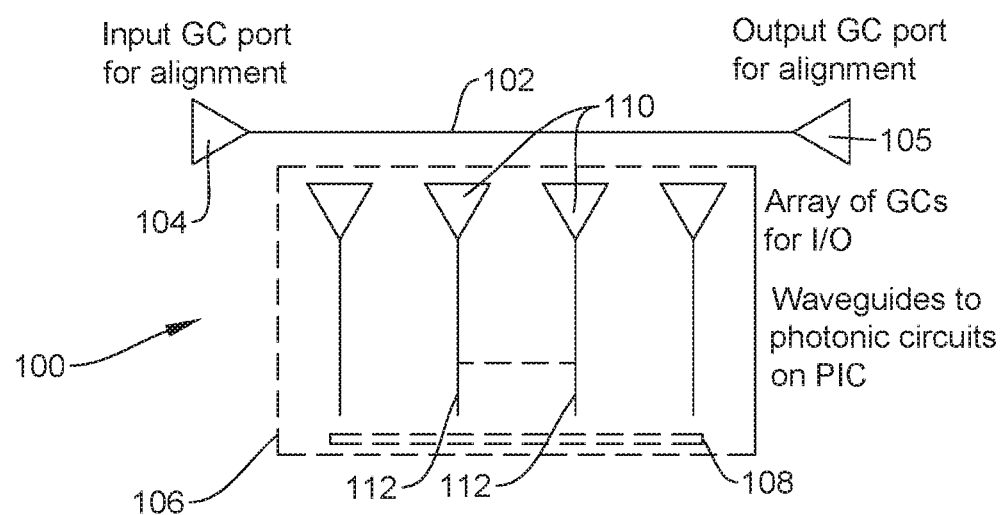
FIG. 5A is a top view of the optoelectronic device in FIG. 4A, schematically illustrating the layout of waveguides and grating couplers, in accordance with one embodiment of the present invention.

FIG. 5A is a top view schematically illustrating the layout of waveguides and grating couplers at the top surface of the PIC 100, in accordance with one embodiment of the present invention. Specifically, an alignment waveguide 102 is provided with an alignment grating coupler 104 at an input port of the alignment waveguide 102, and an alignment grating coupler 105 at an output port of the alignment waveguide 102. The alignment grating couplers 104 and 105 couple an alignment optical signal 10 for optical alignment of the PIC 100 and the OSA 20, which will be discussed in greater detail below (see also FIG. 4B). The alignment waveguide 102 transmit optical signal between the grating coupler 104 at the input port and the grating coupler at the output port. In addition, there are data grating couplers 110 and corresponding data waveguides 112 leading to optical elements, optical components and/or photonic circuits 108, (e.g., lasers, photodiodes, etc., collectively and schematically depicted in FIG. 5) on the PIC 100. The waveguides 102 and 112 are passive optical waveguides, which route optical signals therethrough. The data grating couplers 110 couple optical data signals between the PIC and an OSA during normal active operation of the PIC 100, whereby each of the grating couplers 110 correspond to a data reflective surface 26/optical fiber section 31 in the OSA 20. The alignment grating couplers 104 and 105, the data grating couplers 110, the alignment waveguide 102 and the data waveguide 112 can be formed on the PIC 100 by, e.g., lithographically patterning those features onto the surface of PIC 100.

Generally, optical coupling between PIC and an OSA (in particular an OSA comprising an OFSA) is discussed in US2016/0377821A1 (commonly assigned to the assignee of the present invention, and fully incorporated by reference herein). As disclosed therein, aspherical concave mirrors in the OFSA fold, reshape and/or focus light entering or exiting the array of optical fibers into diffractive grating couplers on the surface of the PIC, so as to allow the axis of the optical fiber to be oriented at small angles or parallel to the surface of the PIC, and lowered close to the surface of the PIC. The mirror is further configured to reshape light from a flat polished optical fiber to produce a mode field resembling the mode field of an angled polished optical fiber, to match the design angle of existing grating couplers that are designed to work with angled polished optical fibers. The mirror and optical fiber alignment structure in the optical connector are integrally/simultaneous formed by precision stamping. The present invention takes advantage of the concepts disclosed therein.

In one embodiment, the alignment waveguide 102 is disposed outside the active region 106 of the PIC 100. In the context of the present invention, the active region 106 of the optoelectronic device is the region where optical paths are defined for transmissions of optical data signals between the optical subassembly and the PIC during normal active operations of the PIC. In the illustrated embodiment of FIG. 5, the input grating coupler 104 and the output grating coupler 105 are located at two ends of the alignment waveguide 102 that extends along one side of the row of data grating couplers 110.

Figure 2A:
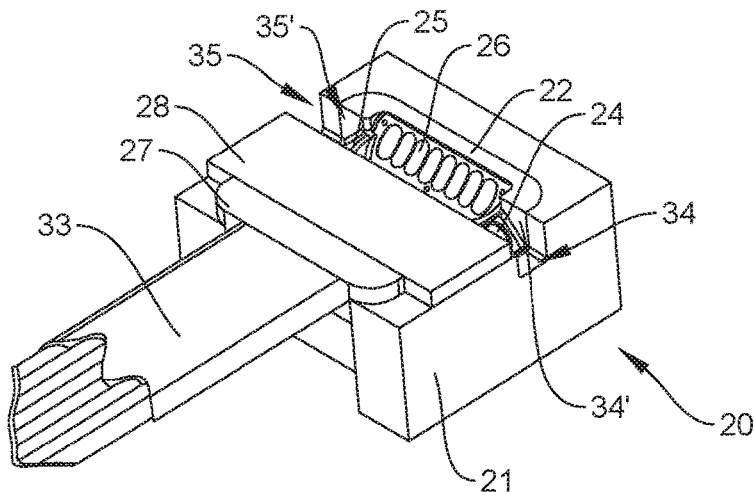
FIG. 2A is a perspective view of an optical subassembly comprising an optical bench subassembly in accordance with one embodiment of the present invention.
Figure 2B:
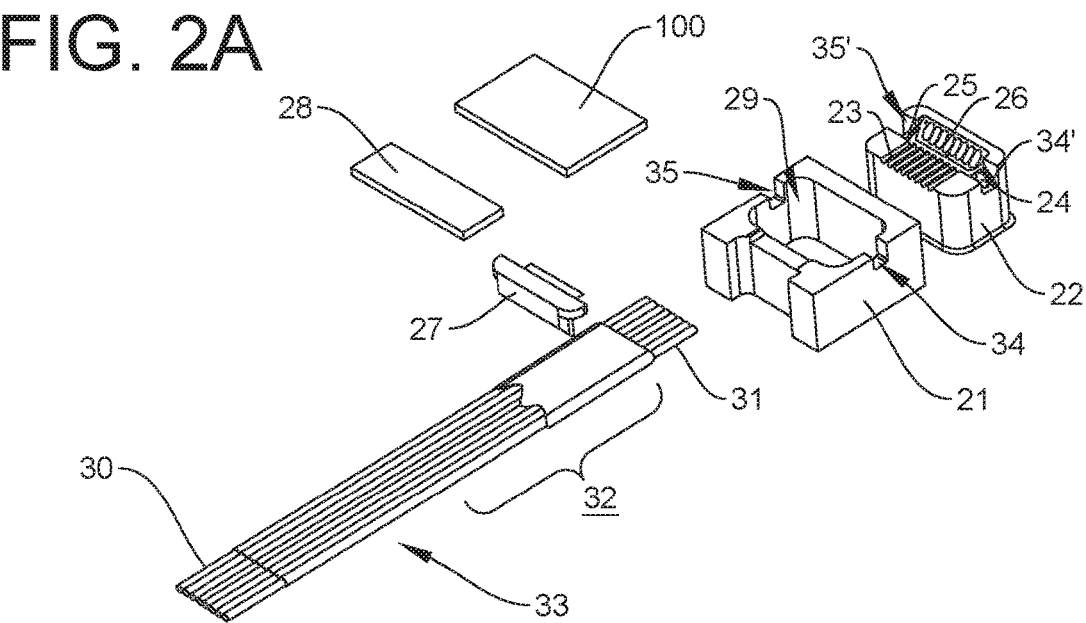
FIG. 2B is an exploded view thereof.
Figures 3A, 3B:
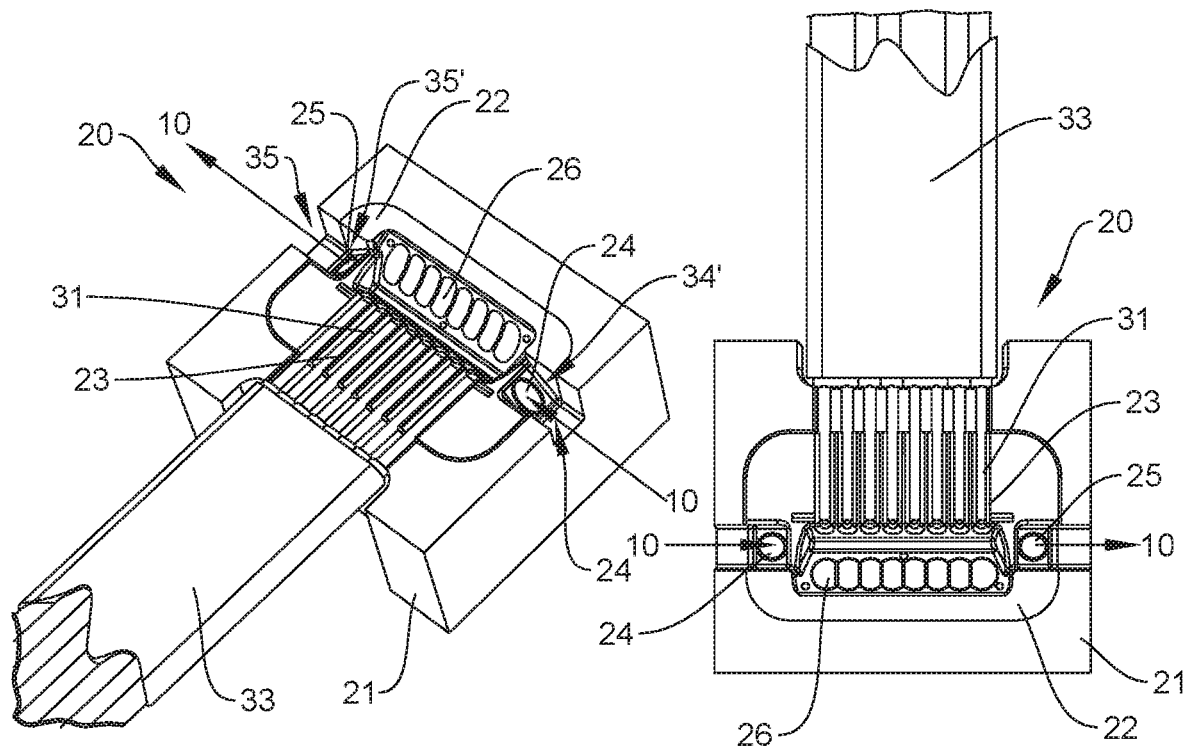
FIG. 3A is a perspective view of the optical subassembly of FIG. 2A.
FIG. 3B is a top view of the optical subassembly of FIG. 2A.
Figure 3C:
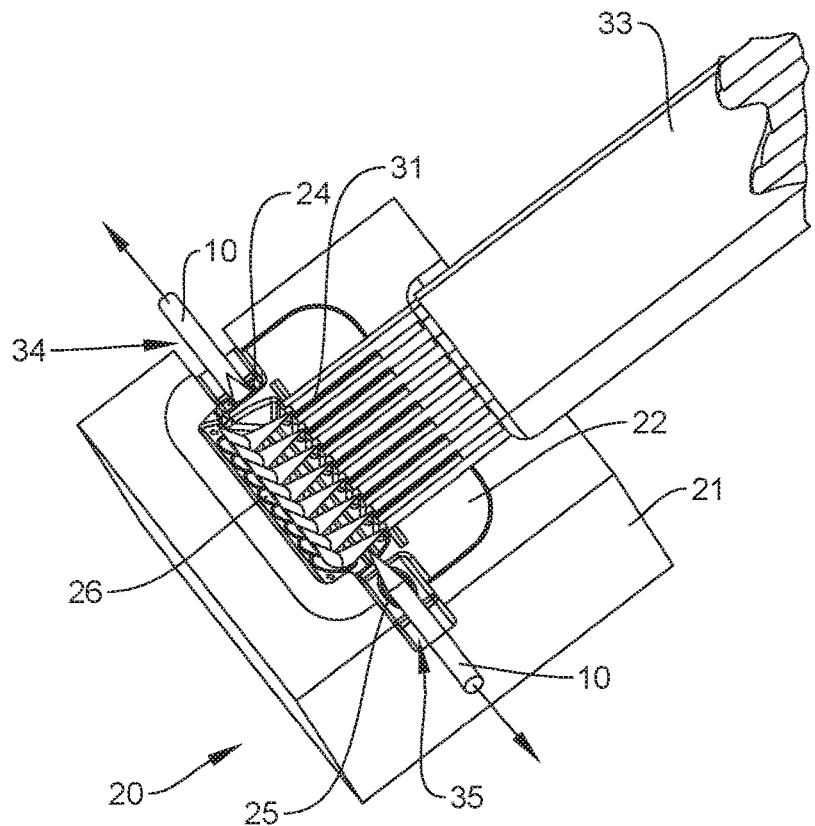
FIG. 3C is a perspective view of the optical subassembly of FIG. 2A, showing signal paths of data optical signals and alignment optical signals.
Figure 4A:
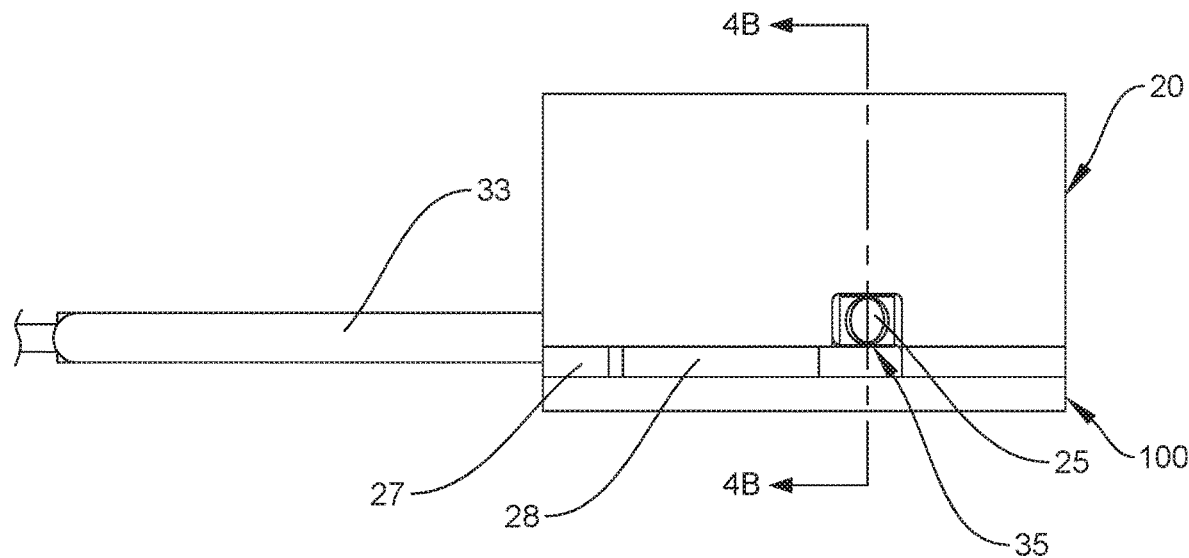
FIG. 4A is a side view illustrating the placement of the optical subassembly on an optoelectronic device.
Figure 4B:
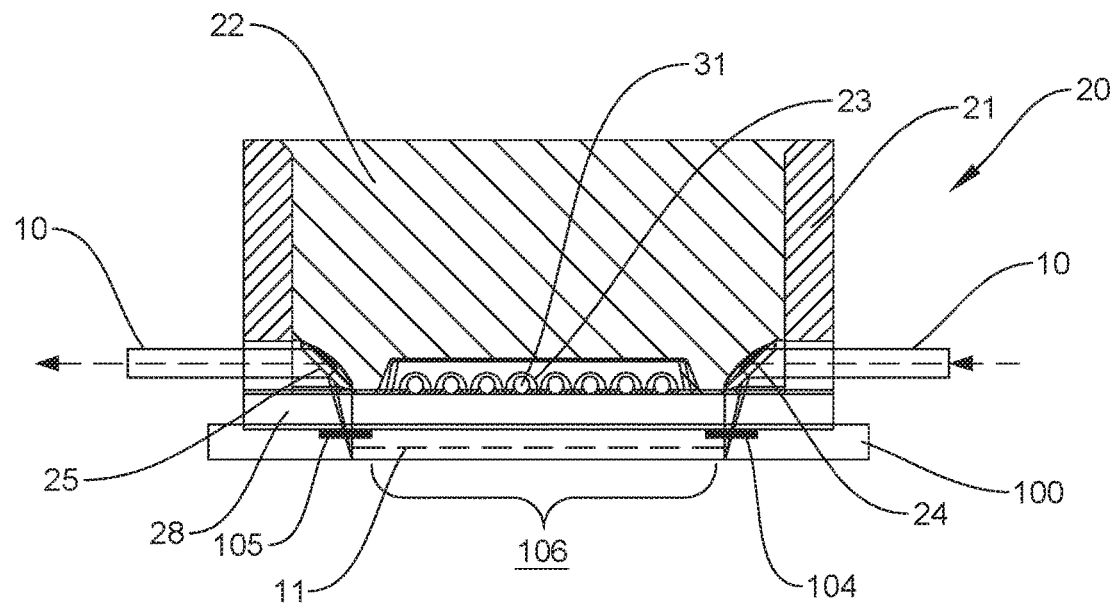
FIG. 4B is a sectional view taken along FIG. 4B-4B in FIG. 4A.

FIGS. 4A and 4B illustrate placement of the OSA 20 on the PIC 100 for optical alignment in accordance with the present invention. FIG. 3C is a perspective view of the OSA 20 in FIG. 2A, showing signal paths of data optical signals and alignment optical signals. Referring to FIG. 4B, the optical path 11 of the alignment optical signal 10 is shown. The alignment optical signal 10 from the external source is incident onto the aspherical concave alignment reflective surface 24, which folds, reshapes and/or focuses the optical signal 10, to be incident at the grating coupler 104 at the input port of the alignment waveguide 102. In this embodiment, the alignment optical signal 10 enters through the base 21 from its side. The alignment optical signal 10 transmits through the alignment waveguide 102, and exits through the grating coupler 105 at the output port of the alignment waveguide 102. The aspherical concave alignment reflective surface 25 folds, reshapes, and/or collimates the alignment optical signal 10 to be transmitted to the external receiver. In this embodiment, the alignment signal 10 exists through the base 21 from its opposing side. By monitoring the power level of the alignment optical signal 10 from the alignment reflective surface 25, the best optical alignment is at the point of maximum power level reading at the power meter. After achieving optical alignment, the OSA 20 is attached to the PIC 100 using epoxy or soldering, to secure the relative positions of the OSA 20 and the PIC. After optical alignment, the data grating couplers 110 on the PIC 100 would also be optically aligned with the corresponding data reflective mirrors 26 in the OSA 20. In accordance with the present invention, no active alignment using optical signals via the fiber sections 31, data reflective surfaces 26 and grating couplers 110 would be required to achieve optical alignment of the OSA 20 and the PIC 100.

As can be understood, the alignment optical signal 10 is a dedicated signal for optical alignment of the OSA 20 and the PIC 100. Such alignment optical signal 10 is not present after the optical alignment process, and during normal action operations of the PIC 100.

In practice, a pick-and-place gripper mechanism holds the OSA 20 on a stage that can translate and orient the OSA 20 with respect to the PIC 100. An optical fiber cable extends from the external source (e.g., a laser) to the body of the gripper. The gripper provides optical alignment between the tip of the fiber-optic cable and the alignment reflective surface 24. A second optical fiber cable would run from the gripper to the receiver (e.g., a photodiode connected to a power meter), and the gripper would assure alignment between this optical fiber cable and the alignment reflective surface 25. These two optical fiber cables would be attached in the gripper so that each time the gripper picks-up a new OSA, it is automatically aligned to the input and output end faces of the optical fiber cables. Lenses can be added into the gripper to focus the light exiting/entering the end faces of the optical fiber cables. The configuration of the pick-and-place gripper will not be further discussed herein, as such gripper can be configured using state of the art gripper mechanisms that are modified to operate in accordance with the present invention. The present invention thus provides a method for optical alignment of an optical subassembly to an optoelectronic device which can be implemented with pick-and-place machinery with about a 1 micrometer positioning accuracy. This is adequate for single-mode optical connections.

In accordance with the present invention, at least the following advantages can be achieved:
a. It is not necessary to energize the photonic circuit during the alignment process since the laser and power meter used during the alignment process can be integrated into the pick-and-place gripper.
b. Optical fibers in the data optical fiber cable (33 in the above described embodiment) are not needed for the alignment process so every fiber in the cable can be used for optical data input/output.
c. The data reflective surfaces (26) for optical data input/output and the alignment reflective surfaces (24, 25) for optical alignment are surface features that can be formed simultaneously in a stamping process to achieve single-mode tolerances.
d. No additional separate components are added by attachment to the optical bench subassembly of the OSA.
e. No additional assembly processes are required during the optical fiber cable termination.

Instead of data grating couplers 110 on the PIC, the present invention can also be used with other surface-emitting or surface-receiving photonic devices, including vertical cavity surface emitting lasers and photodiodes. This is illustrated by example in FIG. 5B for the case of a 1×4 VCSEL (Vertical-Cavity Surface-Emitting Laser) array 130. Similar alignment grating couplers 104' and 105' and alignment waveguide 102' could also be lithographically patterned onto the surface of a VCSEL chip, then an optical subassembly could be optically aligned with the emitting areas of the VCSEL array 130. A similar approach could also be used with a photodiode array (not illustrated).

FIGS. 8-11 illustrates a further embodiment of the present invention. The inventive concept of optical alignment is similar to the previous embodiment, namely, optical alignment between an optical subassembly and an optoelectronic device by measuring feedback of optical power of an optical alignment signal provided by an external optical source, which has been transmitted between optical alignment features provided on the optical subassembly and the optoelectronic device. In this embodiment, the optical subassembly further comprises a separate alignment structure having optical alignment features in combination with the optical bench assembly. The alignment structure comprises an alignment foundation supporting the optical bench subassembly in physically alignment to the foundation. The foundation is optically aligned to the optoelectronic device in accordance with the inventive alignment scheme, thereby optically aligning the optical bench subassembly supported on the foundation to the optoelectronic device. In one embodiment, the foundation is provided with alignments features including similar alignment reflective surfaces as the previous embodiment. In another embodiment, the foundation is provided with alignment features including a first pair of alignment reflective surfaces directing an optical alignment signal from the optical source to the input of the waveguide on the optoelectronic device, and a second pair of alignment reflective surfaces reflecting to the optical receiver the alignment signal directed from the output of the waveguide after the alignment signal has been transmitted from the input to the output through the waveguide. By adjusting the relative position between the foundation and the optoelectronic device, and detecting the optical power of the alignment signal reflected from the second pair of alignment reflective surfaces, the optimum optical alignment of the foundation and the optoelectronic device can be determined (e.g., at a detected maximum optical power).

Figure 6A:
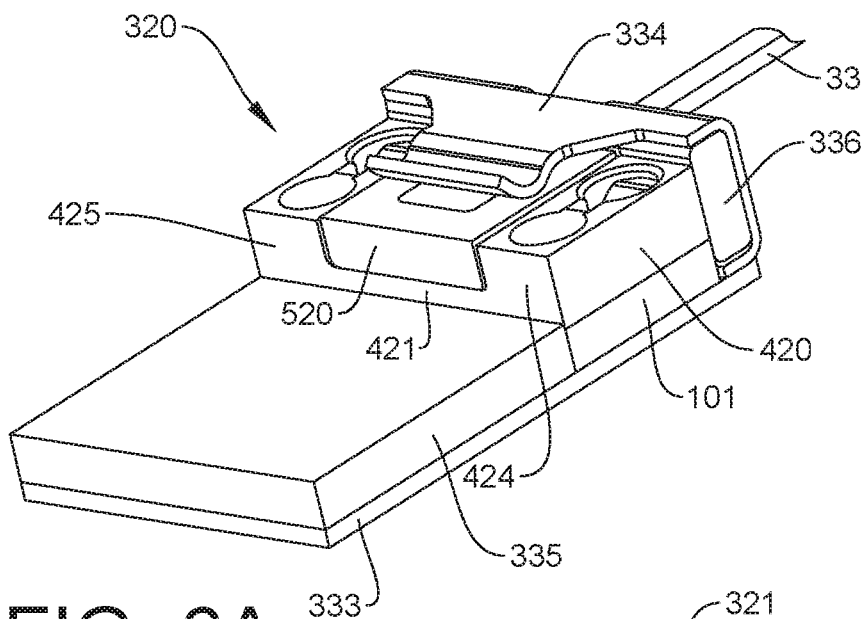
FIG. 6A is a perspective view of an optical subassembly in accordance with an embodiment of the present invention, attached onto an optoelectronic device that is supported on a circuit board.
Figure 6B:
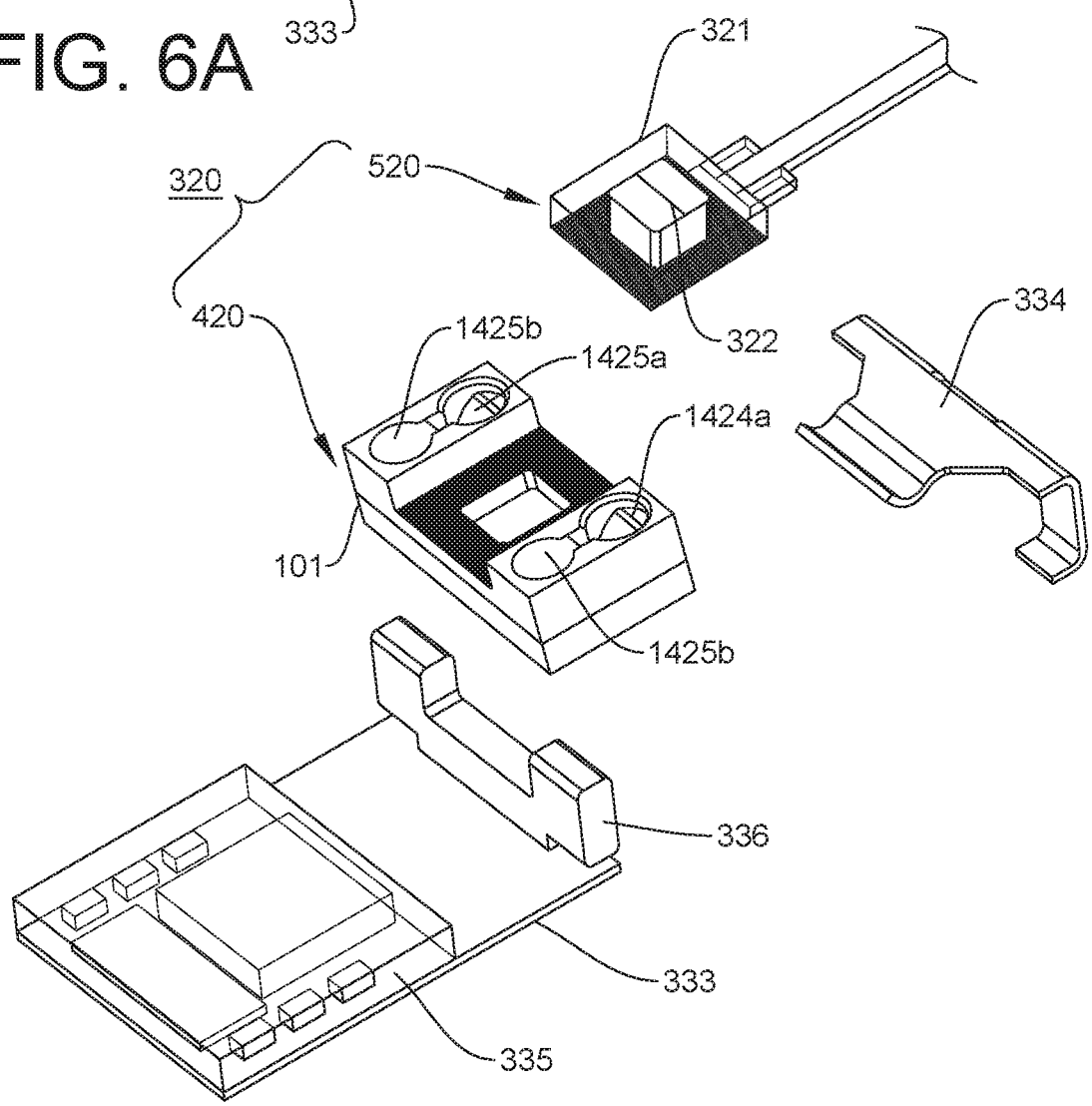
FIG. 6B is an exploded view thereof.

Referring to FIG. 6A to 7E, FIGS. 6A to 6B shows an OSA 320 in accordance with an embodiment of the present invention, mounted onto a PIC 101 that is supported on a circuit board 333 having a ball-grid array (BGA); and FIG. 6B is an exploded view thereof. FIGS. 7A to 7E are various views of the OSA 320 attached to the 101 with the securing clip 334 removed. As shown, an electro-optical module 335 is mounted on the circuit board 333. The circuit board 333 supports an anchor 336 for anchoring the clip 334.

In this illustrated embodiment, the OSA 320 includes an optical bench subassembly in the form of an OFSA 520 and an alignment foundation 420 to which the OFSA 520 is to be mounted. The foundation 420 of the OSA 320 in this embodiment provides the alignment features (namely, alignment reflective surfaces) for optical alignment of the foundation 420 (and thus OSA 320) to the PIC 101. As will be further explained later below, the OFSA 520 can be mounted onto the foundation 420 after optical alignment of the foundation 420 and the PIC 101 had been achieved and secured.

Referring to the embodiment illustrated by FIG. 10, the OFSA 520 has a similar "rivet" structure as the OSA 20 in the previous embodiment, comprises a base 321 and a core 322 supported in a space 329 within the base 321. The core 322 defines a plurality of grooves 323 for securely holding the end sections 31 of optical fibers 30 (i.e., bare sections having cladding exposed, without protective buffer and jacket layers 32) in the optical fiber cable 33. For simplicity, the optical fiber components are not shown in FIG. 10, but may be referred in other drawings in connection with the earlier described embodiment. The core 322 also defines a plurality of data reflective surfaces 326 (e.g., concave aspherical micro-mirror surfaces) arranged in a row, which are each aligned to a corresponding groove 323, so that the end sections 31 of the optical fibers 30 held in grooves 323 are in optical alignment with the data reflective surfaces 326. Similar structures to base 321 and a core 322 and forming process thereof are disclosed in detail in US20160016218A1 (commonly assigned to the assignee of the present invention, and fully incorporated by reference herein), which discloses stamping to form a composite structure of dissimilar materials having structured features, including microscale features that are stamped into a more malleable material (e.g., aluminum) for the core, to form open grooves to retain optical fibers in optical alignment with a stamped array of aspherical micro-mirrors. As a result of stamping the features of the core while the material for the core is in place in the base, the core is attached to the base like a rivet. The present invention takes advantage of the concepts disclosed therein.

The grooves 323 are structured to securely retain the fibers sections 31 (bare section with cladding exposed, without protective buffer and jacket layers) by clamping the fiber section 31, e.g., by a mechanical or interference fit (or press fit). The interference fit assures that the fiber sections 31 are clamped in place and consequently the position and orientation of the fiber section 31 with respect to the data reflective surfaces 326 are set by the location and longitudinal axis of the grooves 323. Further details of the clamping open groove structure can be found in U.S. Pat. No. 8,961,034 B2 (commonly assigned to the assignee of the present invention, and fully incorporated by reference herein). The present invention takes advantage of the concepts disclosed therein.

As shown in FIG. 10, the surface 399 on the same side as the data reflective surfaces 326 is provided with surface textures for demountable passive alignment coupling (to be discussed later below).

Figure 8:
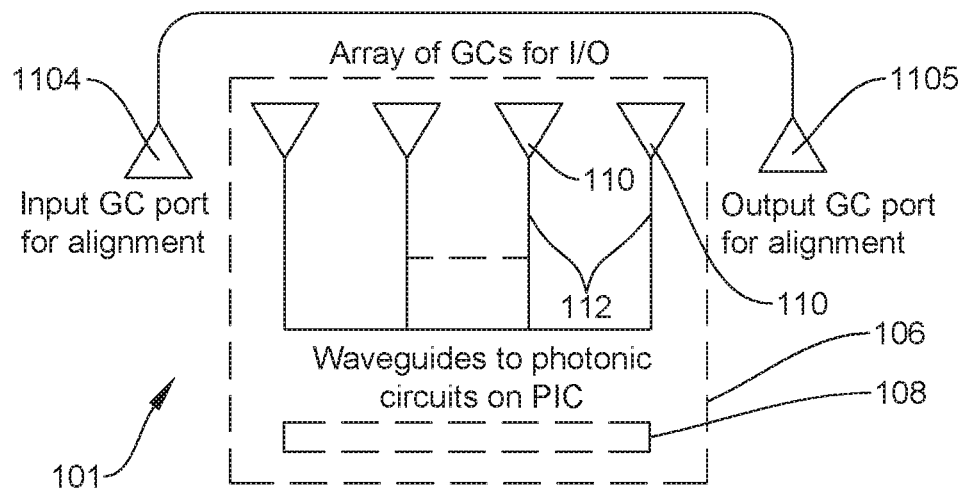
FIG. 8 is a top view of the optoelectronic device in FIG. 7A, schematically illustrating the placements of waveguides and grating couplers, including alignment grating couplers, in accordance with one embodiment of the present invention.
Figure 9A:
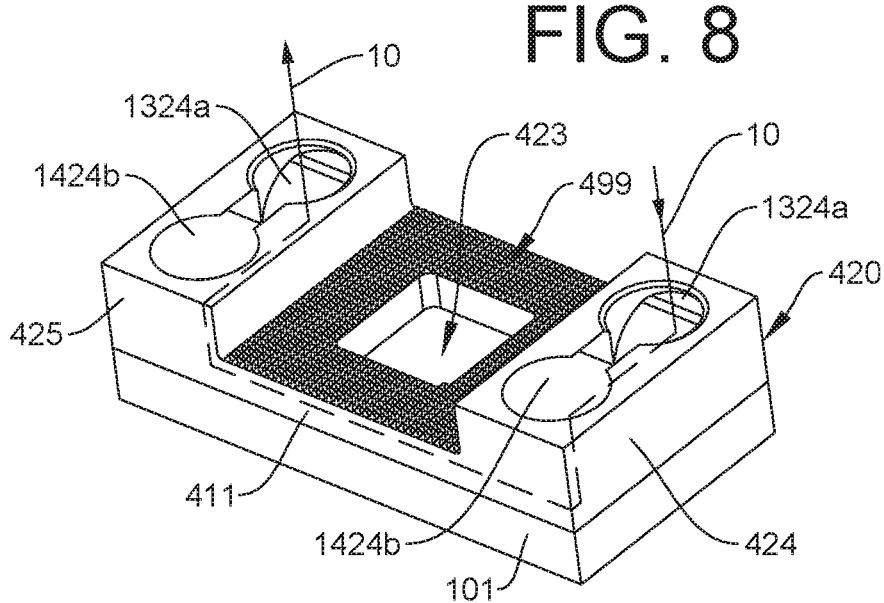
FIG. 9A is a perspective view of the alignment foundation of the optical subassembly in FIG. 6A in accordance with an embodiment of the present invention, disposed on the optoelectronic device for optical alignment.

FIG. 8 is a top view schematically illustrating the layout of waveguides and grating couplers at the top surface of the PIC 101, in accordance with one embodiment of the present invention. As in the previous amendment, an alignment waveguide 1102 is provided with an alignment grating coupler 1104 at an input port of the alignment waveguide 1102, and an alignment grating coupler 1105 at an output port of the alignment waveguide 1102. The alignment grating couplers 1104 and 1105 couple an alignment optical signal 10 for optical alignment of the PIC 101 and the OSA 320 (via the foundation 420). The alignment waveguide 1102 transmit optical signal between the grating coupler 1104 at the input port and the grating coupler at the output port. In addition, there are data grating couplers 110 and corresponding data waveguides 112 leading to optical elements, optical components and/or photonic circuits 108, (e.g., lasers, photodiodes, etc., collectively and schematically depicted in FIG. 5) on the PIC 101. The waveguides 1102 and 112 are passive optical waveguides, which route optical signals therethrough. The data grating couplers 110 couple optical data signals between the PIC 101 and the OSA 320 during normal active operation of the PIC 101, whereby each of the grating couplers 110 correspond to a data reflective surface 326/optical fiber section 31 in the OSA 320. The alignment grating couplers 1104 and 1105, the data grating couplers 110, the alignment waveguide 1102 and the data waveguide 112 can be formed on the PIC by, e.g., lithographically patterning those features onto the surface of PIC 101.

In the illustrated embodiment, the alignment waveguide 1102 is disposed outside the active region 106 of the PIC 100. In this embodiment, the input alignment grating coupler 1104 and the output alignment grating coupler 1105 are located at two ends of the alignment waveguide 1102 that extends generally along one side of the row of data grating couplers 110. Unlike the previous embodiment, the ends of the alignment waveguide 1102 curve towards the row of grating coupler 110, such that alignment grating couplers 1104 and 1105 are generally in line with the line of grating couplers 110. The alignment grating couplers 1104 and 1105 are nonetheless outside of the active region 106. This modified layout geometry corresponds to the relative location of the alignment reflective surfaces on the foundation 420 with respect to the data reflective surfaces on the OFSA 520, which does not affect the inventive concept of the present invention.

As shown in the figures, the foundation 420 is configured as a unitary, monolithic U-shaped block, with a thinner middle section 421 flanked on each side by two thicker sections 324, which defines a space 422 for receiving the OFSA 520 (as shown in FIG. 7A). An opening is provided at the middle section 421 to allow passage of data optical signals between the OFSA 520 and the PIC 101. The top surface of the section 421 is provided with surface textures for demountable passive alignment coupling to the OFSA 520 (to be discussed later below).

Not illustrated in the figures, the foundation 420 of the OSA 320 may be provided with alignments features including similar alignment reflective surfaces provided on the core 22 in the previous embodiment (i.e., providing first and second alignment reflective surfaces on the foundation 420 (instead of the core of the OFSA), and providing an external alignment signal 10 entering the side of the foundation 420 to incident on a first alignment reflective surface to be redirected to the alignment grating coupler 1104 on the PIC 101, and the same alignment signal output from the grating coupler 1105 is redirected by a second alignment reflective surface to exit the opposing side of the foundation 420).

FIGS. 9A to 9D illustrate a modified optical alignment features which accommodate an alignment optical signal 10 that is incident vertical with respect to the OSA 320. Specifically in this embodiment, the foundation 420 is provided with alignment features including a first complementary pair of alignment reflective surfaces directing an optical alignment signal from the optical source to the input of the waveguide on the optoelectronic device, and a second pair of complementary alignment reflective surfaces reflecting to the optical receiver the alignment signal directed from the output of the waveguide after the alignment signal has been transmitted from the input to the output through the waveguide. By adjusting the relative position between the foundation and the optoelectronic device, and detecting the optical power of the alignment signal reflected from the second pair of alignment reflective surfaces, the optimum optical alignment of the foundation and the optoelectronic device can be determined (e.g., at a detected maximum optical power). The first and second pairs of alignment reflective surface are more clearly shown in FIGS. 9B and 9D.

The first pair 324 of alignment reflective surfaces are provided at the portion 424 of the foundation 420, and the second pair 325 of alignment reflective surfaces are provided at the portion 425 of the foundation 420. The first pair 324 comprises alignment reflective surfaces 1324a and 1324b; the second pair 325 comprises alignment reflective surfaces 1325a and 1325b. Alignment reflective surfaces 1324a and 1325a may be flat reflective surfaces, and the alignment reflective surface 1324b and 1325b may be concave aspherical reflective surfaces. Regardless, the geometry of the alignment reflective surfaces in each pair is matched, so that incident external alignment optical signal 10 is shaped, fold, and/or focused onto the corresponding grating coupler 1104 with a vertical optical path, and the alignment optical signal 10 from the grating coupler 1105 is shaped, fold and/or collimated to be directed to the external power meter with a vertical optical path.

Figure 7E:
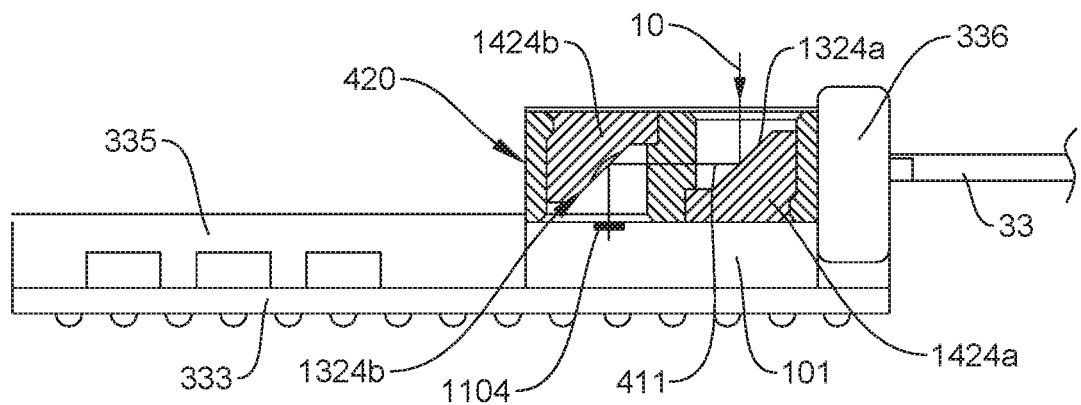
FIG. 7E is a sectional view taken along line 7E-7E in FIG. 7C.

As illustrated, the alignment reflective surfaces in each pair are configured to fold the alignment optical signal twice to follow a zig-zag optical path 411 (FIGS. 7E and 9D), such that the incident optical path and the output optical path for each pair are generally parallel. As shown in FIGS. 7E and 9D, the alignment reflective surface 1324a folds incident alignment optical signal 10, redirect alignment optical signal 10 to alignment reflective surface 1324b, which folds the alignment optical signal 10 and redirect to the grating coupler 1104 on the PIC 101. The alignment reflective surfaces 1324a, 1324b, 1325a, 1325b may be formed by stamping a dissimilar core materials within the portions 424 and 425, using the "rivet" approach to stamping disclosed in detail in US20160016218A1 (commonly assigned to the assignee of the present invention, and fully incorporated by reference herein). This is analogous to stamp forming the core 22 in the base 21 of the OSA 20 in the earlier embodiment. By using the appropriate die and punch set, the two alignment reflective surfaces for both pairs (i.e., all four alignment reflective surfaces) may be stamp simultaneously in a final stamping operation, so as to accurately define the relative position of the two alignment reflective surfaces with the foundation 420. As illustrated, the rivet 1424a defines the alignment reflective surface 1324a, the rivet 1424b defines the alignment reflective surface 1324b, the rivet 1425a defines the alignment reflective surface 1325a, and the rivet 1425b defines the alignment reflective surface 1325b.

FIGS. 7E and 9D illustrate placement of the foundation 420 on the PIC 101 for optical alignment in accordance with the present invention. The optical path 411 of the alignment optical signal 10 is shown. As shown in FIGS. 7E and 9D, the alignment reflective surface 1324a folds the vertical incident alignment optical signal 10, redirect alignment optical signal 10 to alignment reflective surface 1324b, which folds the alignment optical signal 10 and redirect to the grating coupler 1104 on the PIC 101. In this embodiment, the alignment optical signal 10 enters through the foundation 420 from its top side. Referring also to FIGS. 7B and 7C, the alignment optical signal 10 transmits through the alignment waveguide 1102 on the PIC 101, and exits through the grating coupler 1105 at the output port of the alignment waveguide 102. The alignment reflective surface 1325b folds, reshapes, and/or collimates the alignment optical signal 10 to be redirected to the alignment reflective surface 1325a to be redirected vertical to the foundation to the external receiver. In this embodiment, the alignment signal 10 exists through the foundation 420 vertically, parallel to the incident alignment optical signal 10 to foundation 420. See also FIG. 7A for a three-dimensional perspective of the optical path 411 of the optical alignment signal 10. By monitoring the power level of the alignment optical signal 10 from the alignment reflective surface 1325a, the best optical alignment is at the point of maximum power level reading at the power meter. Once optical alignment is achieved, the foundation 420 is attached to the PIC 101 using epoxy or soldering, to secure the relative positions of the foundation 420 and the PIC 101.

In one embodiment, the OFSA 520 and the foundation 420 may be coupled by a reconnectable or demountable connection that is configured and structured to allow the OFSA 520 to be removably attachable for reconnection to the foundation 420 in alignment therewith, after the foundation 420 has been optically aligned to PIC 101. The foundation 420 may be permanently attached with respect to the PIC 101, but the OFSA 520 would still be demountable. Alignment between the foundation 420 and the OFSA (i.e., an optical bench subassembly) may be achieved by passive, kinematic coupling, quasi-kinematic coupling, or elastic-averaging coupling. In the embodiment illustrated in FIGS. 9B and 9D, the demountable passive alignment coupling is achieved by the surface textures 399 and 499 provided on the facing surfaces of the OFSA 520 and the section 421 of the foundation 420. The passive alignment coupling allows the OFSA 520 to be detachably coupled to the optoelectronic device, via a foundation 420 that has been optically aligned to the optoelectronic device. The OFSA 520 can be detached from the foundation 420 and reattached to the foundation 420 without compromising optical alignment. Accordingly, the foundation 420 can be attached to the PIC 101 on a circuit board 333 by optical alignment in accordance with the present invention, and after the circuit board 333 is completely populated, an optical bench subassembly (e.g., OFSA 520) with optical fiber cable 33 can be operatively connected to the circuit board 333. Consequently, the optical fiber cable 333 is not in the way during the assembly of the circuit board 333. Demountable connection with passive alignment discussed above and the benefits thereof are discussed in detail in US2016/0161686A1 (commonly assigned to the assignee of the present invention, and fully incorporated by reference herein). The present invention takes advantage of the concepts disclosed therein.

The clip 334 provides a means of securing the demountable OFSA 420 onto the foundation 420, but clamping onto the anchor 336 attached to the circuit board 333.

After optical alignment, the data grating couplers 110 on the PIC 101 would be optically aligned with the corresponding data reflective mirrors 326 in the OFSA 520. In accordance with the present invention, as in the previous embodiment, no active alignment using optical signals via the fiber sections 31, data reflective surfaces 326 and grating couplers 110 would be required to achieve optical alignment of the foundation 420 (and hence the OSA 320) and the PIC 101.

As can be understood, the alignment optical signal 10 is a dedicated signal for optical alignment of the foundation 420 of the OSA 320 and the PIC 101. Such alignment optical signal 10 is not present after the optical alignment process, and during normal action operations of the PIC 101.

As in the previous embodiment, in practice, a pick-and-place gripper mechanism holds the foundation 420 on a stage that can translate and orient the foundation 420 with respect to the PIC 101. An optical fiber cable extends from the external source (e.g., a laser) to the body of the gripper. The gripper provides optical alignment between the tip of the fiber-optic cable and the alignment reflective surface 1324a. A second optical fiber cable would run from the gripper to the receiver (e.g., a photodiode connected to a power meter), and the gripper would assure alignment between this optical fiber cable and the alignment reflective surface 1325a. These two optical fiber cables would be attached in the gripper so that each time the gripper picks-up a new foundation 420, it is automatically aligned to the input and output end faces of the optical fiber cables. Lenses can be added into the gripper to focus the light exiting/entering the end faces of the optical fiber cables. The configuration of the pick-and-place gripper will not be further discussed herein, as such gripper can be configured using state of the art gripper mechanisms that are modified to operate in accordance with the present invention.

Figure 11A:
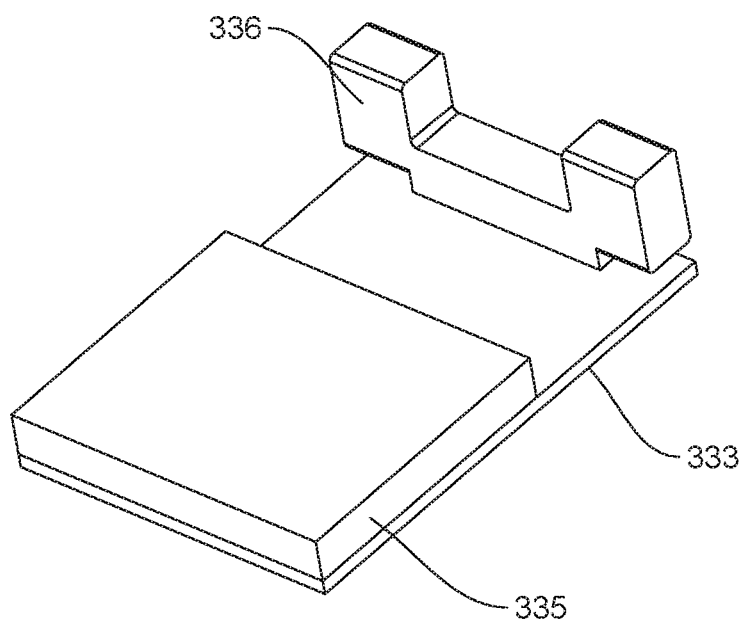
FIG. 11A illustrates the circuit board prepared to receive the alignment foundation of the optical subassembly and optoelectronic device.
Figure 11B:
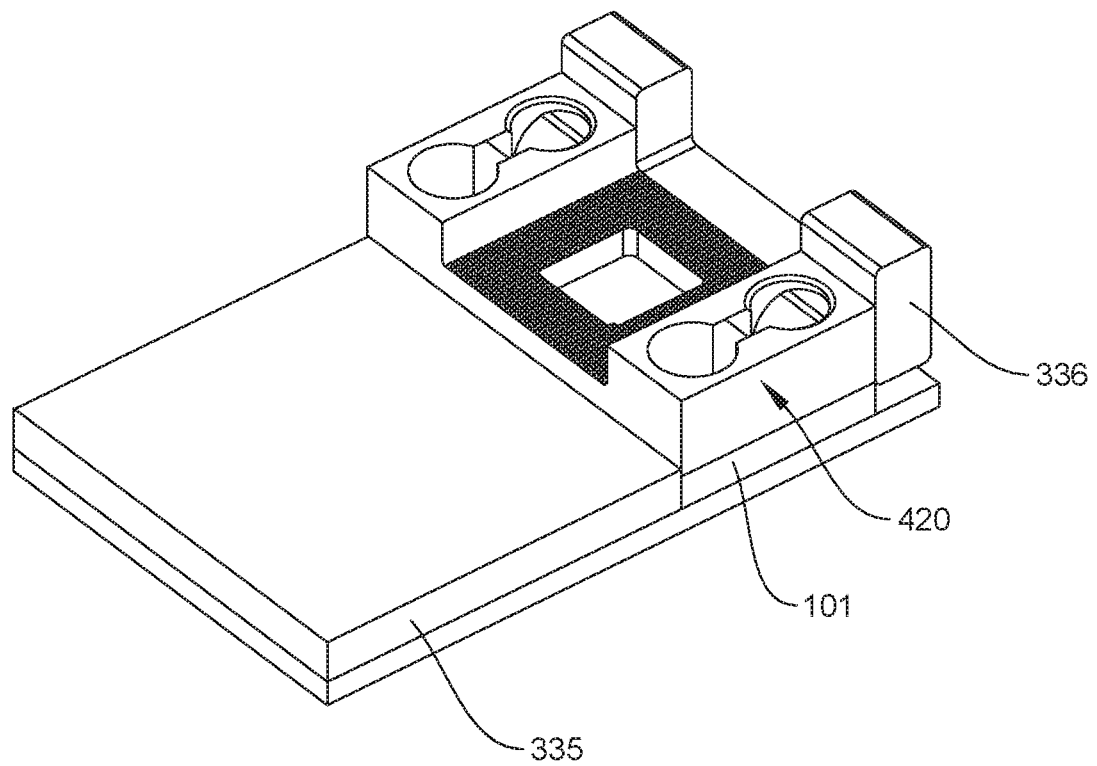
FIG. 11B illustrates the placement of the alignment foundation of the optical subassembly and optoelectronic device after they have been optically aligned.

Referring 11A and 11B, the optically aligned and attached foundation 420 and PIC 101 are positioned on the circuit board 333 that had been populated, with, e.g., electro-optical module 335 (as shown in FIG. 11A) to obtain the structure shown in FIG. 11B, ready for mounting the OFSA 520. More specifically, referring to the flow of the supply chain model shown in FIG. 1, at the Foundry facility, the pick-and-place mechanism align the foundation 420 to the PIC 101. The foundation 420 is, for example, soldered to the PIC 101. This is then shipped to a Packaging facility, where a lower precision pick-and-place mechanism positions and attaches the PIC 101 with the foundation 420 attached thereon onto the circuit board 333. There may be additional components pre-populated or to be populated on the circuit board. The circuit board 333 with the PIC 101 and foundation 420 is then shipped to a Product Assembly facility, where the OFSA 520 is attached to the foundation during product assembly using passive-alignment features discussed above. The present invention thus provides a method for optical alignment of an optical subassembly to an optoelectronic device which can be implemented with pick-and-place machinery with about a 1 micrometer positioning accuracy. This is adequate for single-mode optical connections.

The present embodiment shares most of the advantages of the previous embodiment. In particular, the present embodiment achieves at least the following advantages:

a. It is not necessary to energize the photonic circuit during the alignment process since the laser and power meter used during the alignment process can be integrated into the pick-and-place gripper.
b. Optical fibers in the data optical fiber cable (33) are not needed for the alignment process so every fiber in the cable can be used for optical data input/output.
c. The data reflective surfaces (326) for optical data input/output and the pairs of alignment reflective surfaces (1324a, 1324b, 1325a and 1325b) for optical alignment are surface features that can be formed simultaneously in a stamping process to achieve single-mode tolerances.
d. By optically aligning a foundation 420 to the PIC 101, the overall OSA 320 can remain optically aligned with the use of the demountable coupling of the OFSA 520 to the foundation 420.
e. No additional assembly processes are required during the optical fiber cable termination.

Figure 5B:
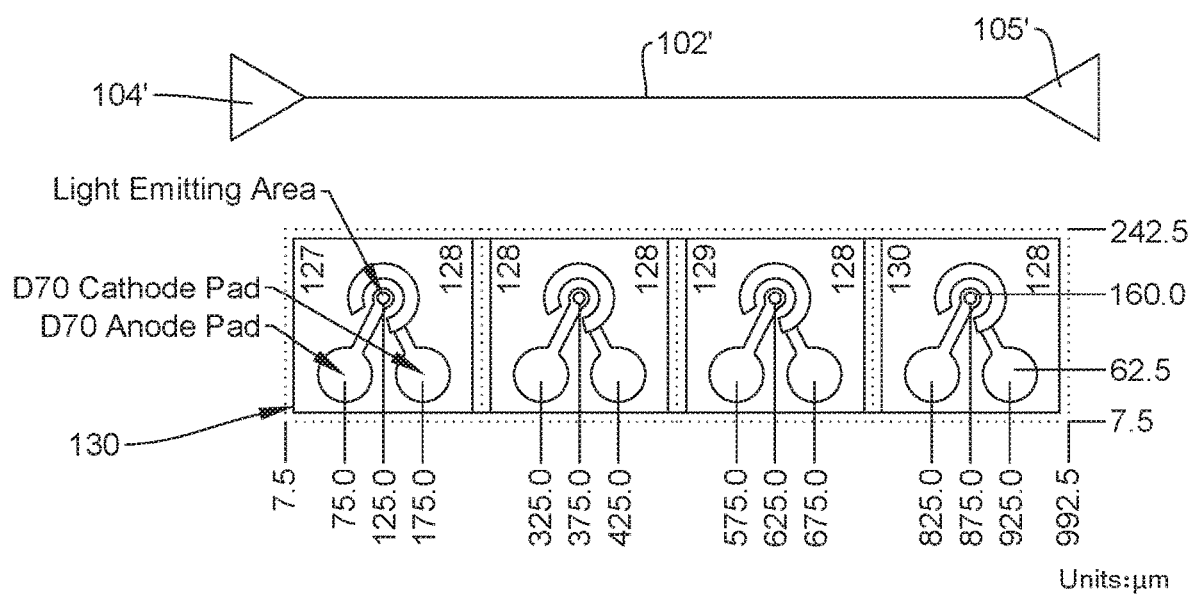
FIG. 5B is a top view of a VCSEL chip, schematically illustrating the layout of waveguides and electro-optical components, in accordance with one embodiment of the present invention.

As for the previous embodiment, the PIC 101 may be replaced with other surface-emitting or surface-receiving photonic devices, including vertical cavity surface emitting lasers and photodiodes, as illustrated by way of example in FIG. 5B.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. An optoelectronic structure, comprising:
an optoelectronic device, wherein the optoelectronic device comprises an optical alignment waveguide outside an active region of the optoelectronic device, wherein the alignment waveguide includes an input alignment grating coupler and an output alignment grating coupler; and
an optical subassembly optically aligned to the optoelectronic device, comprising:
a foundation, wherein the foundation comprises a body having a first alignment reflective surface and a second alignment reflective surface, wherein the first alignment reflective surface is configured to be accessible to an external optical source of an alignment optical signal, wherein the first alignment reflective surface reflects the alignment optical signal to the input alignment grating coupler, and the output alignment grating coupler directs the same alignment optical signal to the second alignment reflective surface, and wherein the second alignment reflective surface is accessible to an external optical receiver of the alignment optical signal; and
an optical bench subassembly demountably coupled to the foundation,
wherein the first alignment reflective surface defines a first optical path that directs the optical alignment signal from the optical source to the input alignment grating coupler of the alignment waveguide on the optoelectronic device, and the second alignment reflective surface defines a second optical path reflecting to the optical receiver the alignment signal directed from the output alignment grating coupler after the alignment signal has been transmitted from the input alignment grating coupler to the output alignment grating coupler through the alignment waveguide, so as to determine an optically aligned position between the foundation and the optoelectronic device.

2. The structure as in claim 1, wherein the first and second alignment reflective surfaces are each formed by stamping a malleable metal for the body.

3. The structure of claim 1, wherein the foundation and the optical bench subassembly are demountably coupled by passive alignment.

4. The structure of claim 1, wherein the foundation does not include any optical fiber.

5. The structure of claim 1, wherein the optical bench subassembly comprises at least an optical fiber and at least a reflective surface, wherein the optical fiber is optically aligned to the reflective surface, and wherein the optical fiber is optically coupled to the active region of the optoelectronic device via the reflective surface when the optical subassembly is aligned with the optoelectronic device.

6. The structure of claim 5, wherein the foundation does not include any optical fiber.

7. The structure of claim 5, wherein the foundation and the optical bench subassembly are demountably coupled by passive alignment.

8. The structure of claim 1, wherein the first alignment reflective surface comprises a first pair of reflective surfaces directing an optical alignment signal from the optical source to the input of the waveguide on the optoelectronic device, and the second alignment reflective surface comprises a second pair of reflective surfaces reflecting to the optical receiver the alignment signal directed from the output of the waveguide after the alignment signal has been transmitted from the input to the output through the waveguide.

9. The structure of claim 8, wherein the first pair of reflective surfaces includes a first reflective surface and a second reflective surface defining the first optical path, wherein the first reflective surface directs the optical alignment signal from the optical source to the second reflective surface, which redirects the optical alignment signal to the input alignment grating coupler of the alignment waveguide on the optoelectronic device, wherein the second pair of reflective surfaces includes a third reflective surface and a fourth reflective surface defining the second optical path, and wherein the third reflective surface reflects to the fourth reflective surface the optical alignment signal from the output alignment grating coupler after the alignment signal has been transmitted from the input alignment grating coupler to the output alignment grating coupler through the alignment waveguide, and the fourth reflective surface reflects the optical alignment signal to the optical receiver.

10. A method of optically aligning an optical subassembly to an optoelectronic device, wherein the optoelectronic device comprises an optical alignment waveguide outside an active region of the optoelectronic device, wherein the alignment waveguide includes an input alignment grating coupler and an output alignment grating coupler; and wherein the optical subassembly comprises a foundation and an optical bench subassembly coupled to the foundation, wherein the foundation comprises a body having a first alignment reflective surface and a second alignment reflective surface, wherein the first alignment reflective surface is configured to be accessible to an external optical source of an alignment optical signal, wherein the first alignment reflective surface reflects the alignment optical signal to the input alignment grating coupler, and the output alignment grating coupler directs the same alignment optical signal to the second alignment reflective surface, and wherein the second alignment reflective surface is accessible to an external optical receiver of the alignment optical signal;

adjusting the relative position between the foundation and the optoelectronic device; and detecting the optical power of the alignment signal reflected from the second alignment reflective surface, to determine a position of best optical alignment of the foundation to the optoelectronic device, wherein the first alignment reflective surface defines a first optical path that directs the optical alignment signal from the optical source to the input alignment grating coupler of the alignment waveguide on the optoelectronic device, and the second alignment reflective surface defines a second optical path reflecting to the optical receiver the alignment signal directed from the output alignment grating coupler after the alignment signal has been transmitted from the input alignment grating coupler to the output alignment grating coupler through the alignment waveguide, so as to determine an optically aligned position between the foundation and the optoelectronic device.

11. The method of claim 10, wherein the foundation and the optical bench subassembly are demountably coupled by passive alignment.

12. The method of claim 11, wherein the first pair of reflective surfaces includes a first reflective surface and a second reflective surface defining the first optical path, wherein the first reflective surface directs the optical alignment signal from the optical source to the second reflective surface, which redirects the optical alignment signal to the input alignment grating coupler of the alignment waveguide on the optoelectronic device, wherein the second pair of reflective surfaces includes a third reflective surface and a fourth reflective surface defining the second optical path, and wherein the third reflective surface reflects to the fourth reflective surface the optical alignment signal from the output alignment grating coupler after the alignment signal has been transmitted from the input alignment grating coupler to the output alignment grating coupler through the alignment waveguide, and the fourth reflective surface reflects the optical alignment signal to the optical receiver.

13. The method of claim 10, wherein the foundation does not include any optical fiber.

14. The method of claim 10, wherein the optical bench subassembly comprises at least an optical fiber and at least a reflective surface, wherein the optical fiber is optically aligned to the reflective surface, and wherein the optical fiber is optically coupled to the active region of the optoelectronic device via the reflective surface when the optical subassembly is aligned with the optoelectronic device.

15. The method of claim 14, wherein the foundation does not include any optical fiber.

16. The method of claim 14, wherein the foundation and the optical bench subassembly are demountably coupled by passive alignment.

17. The method of claim 10, wherein the first and second alignment reflective surfaces are each formed by stamping a malleable metal for the body.

18. The method of claim 10, wherein the first alignment reflective surface comprises a first pair of reflective surfaces directing an optical alignment signal from the optical source to the input of the waveguide on the optoelectronic device, and the second alignment reflective surface comprises a second pair of reflective surfaces reflecting to the optical receiver the alignment signal directed from the output of the waveguide after the alignment signal has been transmitted from the input to the output through the waveguide.

* * * * *